US009624648B2

(12) United States Patent
Arimatsu et al.

(10) Patent No.: US 9,624,648 B2
(45) Date of Patent: Apr. 18, 2017

(54) DISPLAY SYSTEM FOR EXCAVATING MACHINE, EXCAVATING MACHINE, AND DISPLAY METHOD FOR EXCAVATING MACHINE

(71) Applicant: Komatsu Ltd., Tokyo (JP)

(72) Inventors: Daiki Arimatsu, Hiratsuka (JP); Masao Yamamura, Hirakata (JP)

(73) Assignee: Komatsu Ltd., Tokyo (JP)

( * ) Notice: Subject to any disclaimer, the term of this patent is extended or adjusted under 35 U.S.C. 154(b) by 393 days.

(21) Appl. No.: 14/385,218

(22) PCT Filed: May 15, 2014

(86) PCT No.: PCT/JP2014/062999
§ 371 (c)(1),
(2) Date: Sep. 15, 2014

(87) PCT Pub. No.: WO2015/173936
PCT Pub. Date: Nov. 19, 2015

(65) Prior Publication Data
US 2016/0251834 A1    Sep. 1, 2016

(51) Int. Cl.
*G06F 11/30* (2006.01)
*E02F 9/26* (2006.01)
(Continued)

(52) U.S. Cl.
CPC ............... *E02F 9/26* (2013.01); *B60K 35/00* (2013.01); *E02F 3/435* (2013.01); *E02F 9/264* (2013.01); *E02F 3/32* (2013.01); *E02F 9/16* (2013.01)

(58) Field of Classification Search
CPC ... E02F 9/20; E02F 9/2025; E02F 9/26; E02F 9/264; B60C 23/0416
(Continued)

(56) References Cited

U.S. PATENT DOCUMENTS 7,831,362 B2 * 11/2010 Ishibashi ............... E02F 9/2045
                                                       37/341
9,043,098 B2 *  5/2015 Nomura ................... E02F 3/32
                                                      340/995.27
(Continued)

FOREIGN PATENT DOCUMENTS

CN    103080432 A    5/2013
CN    103080434 A    5/2013
(Continued)

OTHER PUBLICATIONS

International Search Report and Written Opinion mailed Jul. 22, 2014, issued for PCT/JP2014/062999.

*Primary Examiner* — Thomas G Black
*Assistant Examiner* — Luke Huynh
(74) *Attorney, Agent, or Firm* — Locke Lord LLP

(57) ABSTRACT

An excavating machine obtains first and second target swing information indicating an amount of rotation of the work implement, based on a direction of a tooth edge of the bucket, a direction orthogonal to the target plane, and a direction of a swing central axis, and selects the first or second target swing information, based on the obtained first and second target swing information and a first angle and a second angle, and displays the selected target swing information, the amount of rotation being required for the tooth edge to face the target plane, the first angle being a minimum value and the second angle being a maximum value among angles formed by an axis orthogonal to the swing central axis and parallel to an operating plane of the work implement, and imaginary lines passing through the swing central axis and ends of the target plane.

10 Claims, 25 Drawing Sheets

(51) Int. Cl.
    *E02F 3/43*     (2006.01)
    *B60K 35/00*     (2006.01)
    *E02F 3/32*     (2006.01)
    *E02F 9/16*     (2006.01)

(58) Field of Classification Search
    USPC .......................................... 701/50, 32.9, 33.1
    See application file for complete search history.

(56) References Cited

U.S. PATENT DOCUMENTS

| | | |
|---|---|---|
| 9,411,325 B2 * | 8/2016 | Baba .................... E02F 9/2037 |
| 2013/0158785 A1 | 6/2013 | Fukano et al. |
| 2013/0158787 A1 | 6/2013 | Nomura et al. |
| 2013/0158797 A1 | 6/2013 | Fukano et al. |

FOREIGN PATENT DOCUMENTS

| | | |
|---|---|---|
| CN | 103080437 A | 5/2013 |
| JP | 2006-327722 A | 12/2006 |
| JP | 2012-172431 A | 9/2012 |
| JP | 2014-074319 A | 4/2014 |

* cited by examiner

DISPLAY SYSTEM FOR EXCAVATING MACHINE, EXCAVATING MACHINE, AND DISPLAY METHOD FOR EXCAVATING MACHINE

FIELD

The present invention relates to a display system for an excavating machine, an excavating machine, and a display method for an excavating machine.

BACKGROUND

In general, in an excavator, a work implement including a bucket is driven by an operator operating operating levers. At this time, when a slope with a predetermined inclination, a ditch with a predetermined depth, or the like, is excavated, it is difficult for the operator to determine whether excavation is properly performed just as a target shape, only by visually checking the operation of the work implement. In addition, the operator requires a skill to become able to efficiently and properly excavate such a slope with the predetermined inclination just as the target shape. Hence, for example, there is a technique for assisting the operator by displaying position information of the bucket located at the tip of the work implement, on a display apparatus. For example, Patent Literature 1 describes that a facing compass is displayed as an icon indicating the direction of facing a target plane and the direction in which an excavator is to swing.

CITATION LIST

Patent Literature

Patent Literature 1: Japanese Laid-open Patent Publication No. 2012-172431

SUMMARY

Technical Problem

Patent Literature 1 does not clearly describe how to move the facing compass, etc. It is desired to present the operator with more appropriate information for allowing the bucket to face the target plane.

An object of the present invention is to present the operator with appropriate information for allowing the bucket to face the target plane.

Solution to Problem

According to the present invention, a display system for an excavating machine, the display system being used for an excavating machine that can allow an upper swing body including a work implement having a bucket to swing about a predetermined swing central axis, the display system comprises: a vehicle state detecting unit that detects information about a current position and posture of the excavating machine; a storage unit that stores at least position information of a target plane indicating a target shape of a work object; and a processing unit that obtains first target swing information and second target swing information indicating an amount of swing of the upper swing body including the work implement, based on information including a direction of a tooth edge of the bucket, information including a direction orthogonal to the target plane, and information including a direction of the swing central axis, the amount of swing being required for the tooth edge of the bucket to face the target plane, and the direction of the tooth edge of the bucket being determined based on the information about the current position and posture of the excavating machine, and selects the first target swing information or the second target swing information, based on the obtained first target swing information and second target swing information and a first angle and a second angle, and displays an image corresponding to the selected target swing information on a screen of a display apparatus, the first angle being a minimum value and the second angle being a maximum value among angles formed by an axis orthogonal to the swing central axis and parallel to an operating plane of the work implement, and imaginary lines passing through the swing central axis and ends of the target plane.

In the present invention, it is preferable that when the excavating machine is present on the target plane or is surrounded by the target plane, the processing unit selects one of the first target swing information and the second target swing information that has a larger absolute value.

In the present invention, it is preferable that when the target swing information is not determined or when the target swing information is not obtained, the processing unit makes a display mode of the image corresponding to the target swing information displayed on the display apparatus different from that for when the target swing information is determined or when the target swing information is obtained.

In the present invention, it is preferable that the processing unit makes a mode of the image displayed on the screen of the display apparatus different before and after the tooth edge of the bucket faces the target plane.

In the present invention, it is preferable that the bucket rotates about a first axis and rotates about a second axis orthogonal to the first axis, by which the tooth edge is tilted with respect to a third axis orthogonal to the first axis and the second axis, the display system further comprises a bucket tilt detecting unit that detects a tilt angle of the bucket, and the processing unit determines a direction of the tooth edge of the bucket, based on the tilt angle of the bucket detected by the bucket tilt angle detecting unit and the information about the current position and posture of the excavating machine.

According to the present invention, a display system for an excavating machine, the display system being used for an excavating machine that can allow an upper swing body including a work implement having a bucket to swing about a predetermined swing central axis, the display system comprises: a vehicle state detecting unit that detects information about a current position and posture of the excavating machine; a storage unit that stores at least position information of a target plane indicating a target shape of a work object; and a processing unit that obtains first target swing information and second target swing information indicating an amount of swing of the upper swing body including the work implement, based on information including a direction of a tooth edge of the bucket, information including a direction orthogonal to the target plane, and information including a direction of the swing central axis, the amount of swing being required for the tooth edge of the bucket to face the target plane, and the direction of the tooth edge of the bucket being determined based on the information about the current position and posture of the excavating machine, and selects the first target swing information or the second target swing information, based on the obtained first target swing information and second target swing information and a first angle and a second angle, displays an image corresponding to the selected target swing information, together with an image corresponding to the excavating machine and an image corresponding to the target plane, on a screen of a display apparatus, and performs the display such that a mode of the image displayed on the screen of the display apparatus is different before and after the tooth edge of the bucket faces the target plane, the first angle being a minimum value and the second angle being a maximum value among angles formed by an axis orthogonal to the swing central axis and parallel to an operating plane of the work implement, and imaginary lines passing through the swing central axis and ends of the target plane.

According to the present invention, an excavating machine comprises: an upper swing body that swings about a predetermined swing central axis, a work implement having a bucket being mounted on the upper swing body; a traveling apparatus provided underneath the upper swing body; and the display system for an excavating machine.

According to the present invention, A display method for an excavating machine, the display method being used for an excavating machine that can allow an upper swing body including a work implement having a bucket to swing about a predetermined swing central axis, the display method comprises: obtaining first target swing information and second target swing information indicating an amount of swing of the upper swing body including the work implement, based on information including a direction of a tooth edge of the bucket, information including a direction orthogonal to the target plane, and information including a direction of the swing central, axis, the amount of swing being required for the tooth edge of the bucket to face the target plane, and the direction of the tooth edge of the bucket being determined based on information about a current position and posture of the excavating machine, selecting the first target swing information or the second target swing information based on the obtained first target swing information and second target swing information, and a first angle and a second angle, the first angle being a minimum value and the second angle being a maximum value among angles formed by an axis orthogonal to the swing central axis and parallel to an operating plane of the work implement, and imaginary lines passing through the swing central axis and ends of the target plane, and displaying an image corresponding to the selected target swing information on a screen of a display apparatus.

In the present invention, it is preferable that when the excavating machine is present on the target plane or is surrounded by the target plane, one of the first target swing information and the second target swing information that has a larger absolute value is selected.

The present invention can present the operator with appropriate information for allowing the bucket to face the target plane.

DESCRIPTION OF EMBODIMENTS

A mode (embodiment) for carrying out the present invention will be described in detail with reference to the drawings.

<Overall Configuration of an Excavating Machine>

Figure 1:
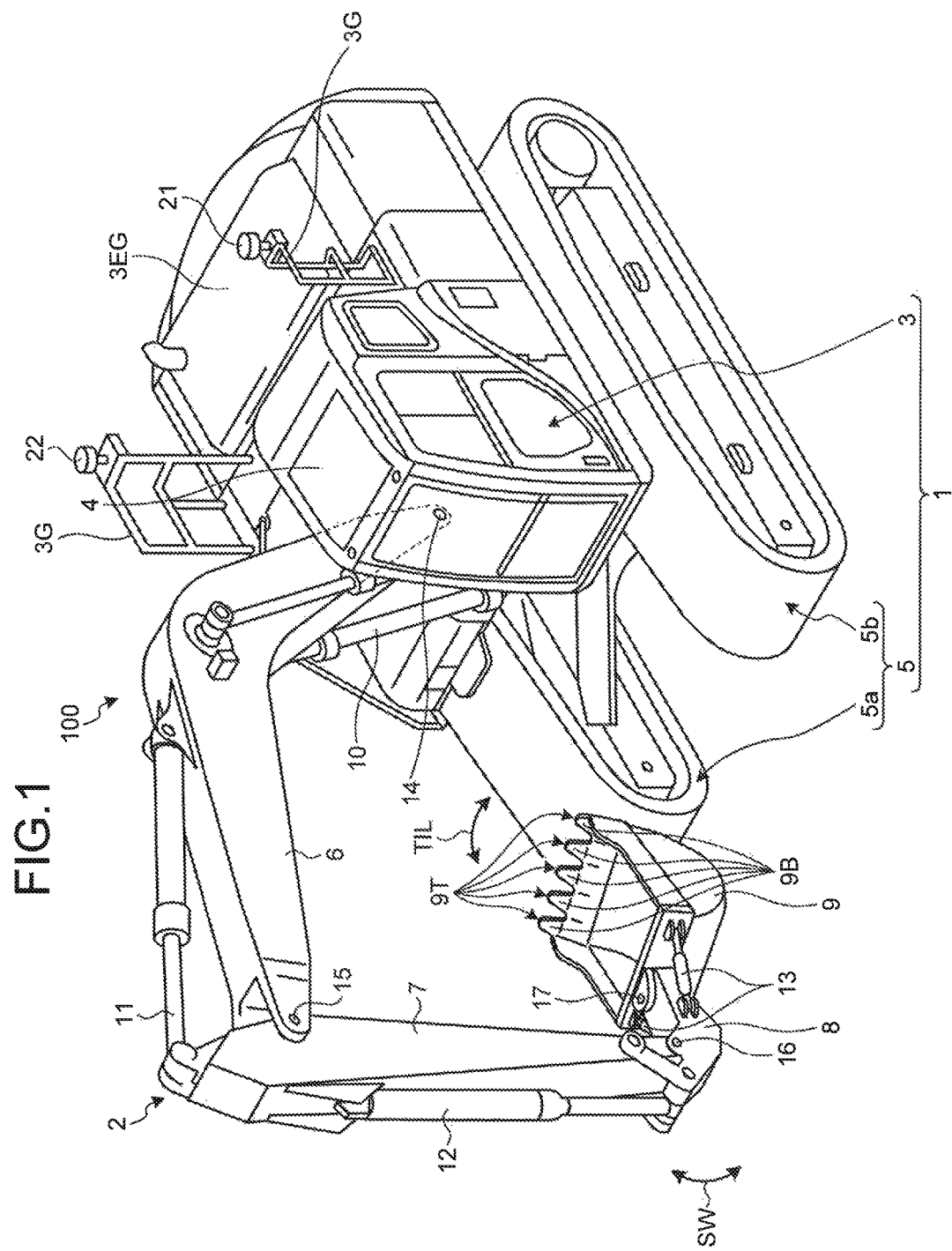
FIG. 1 is a perspective view of an excavator according to the present embodiment.
Figure 2:
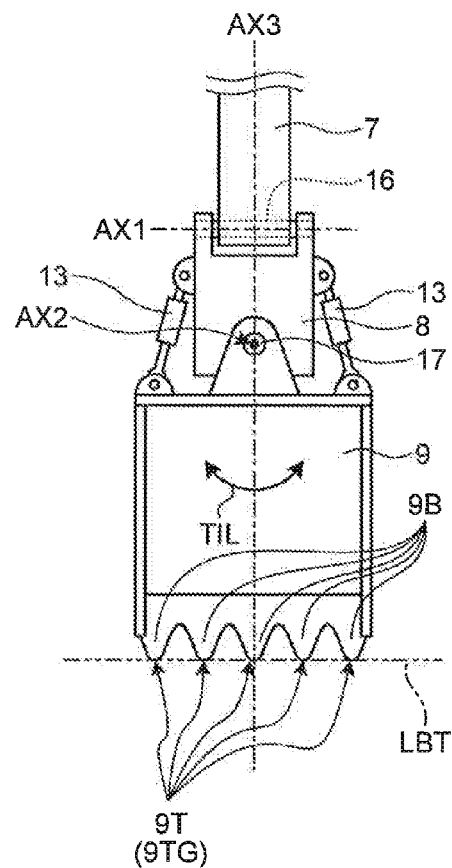
FIG. 2 is a front view of a bucket included in the excavator according to the present embodiment.
Figure 3:
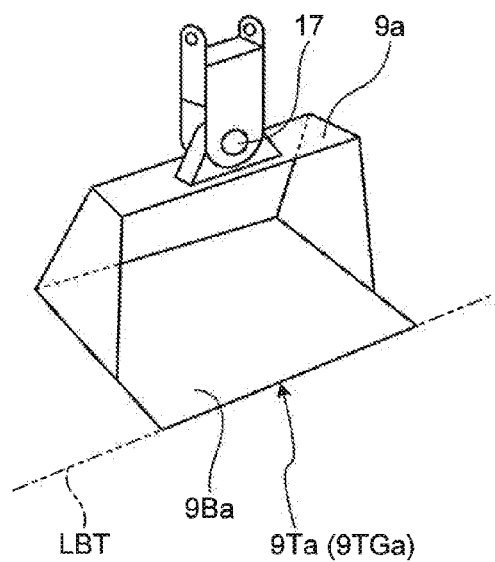
FIG. 3 is a perspective view of a bucket according to another example included in the excavator according to the present embodiment.
Figure 4:
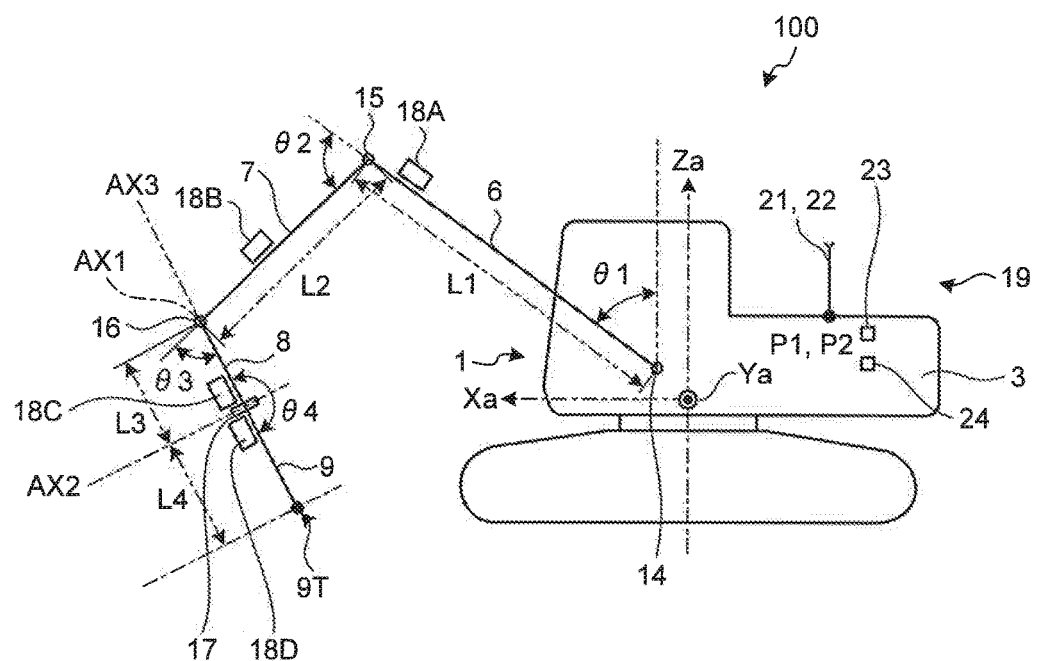
FIG. 4 is a side view of the excavator.
Figure 5:
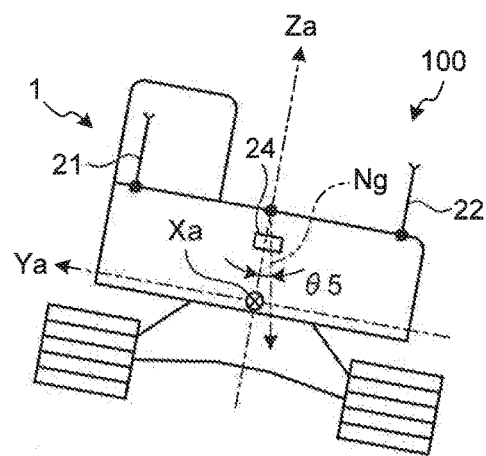
FIG. 5 is a rear view of the excavator.
Figure 6:
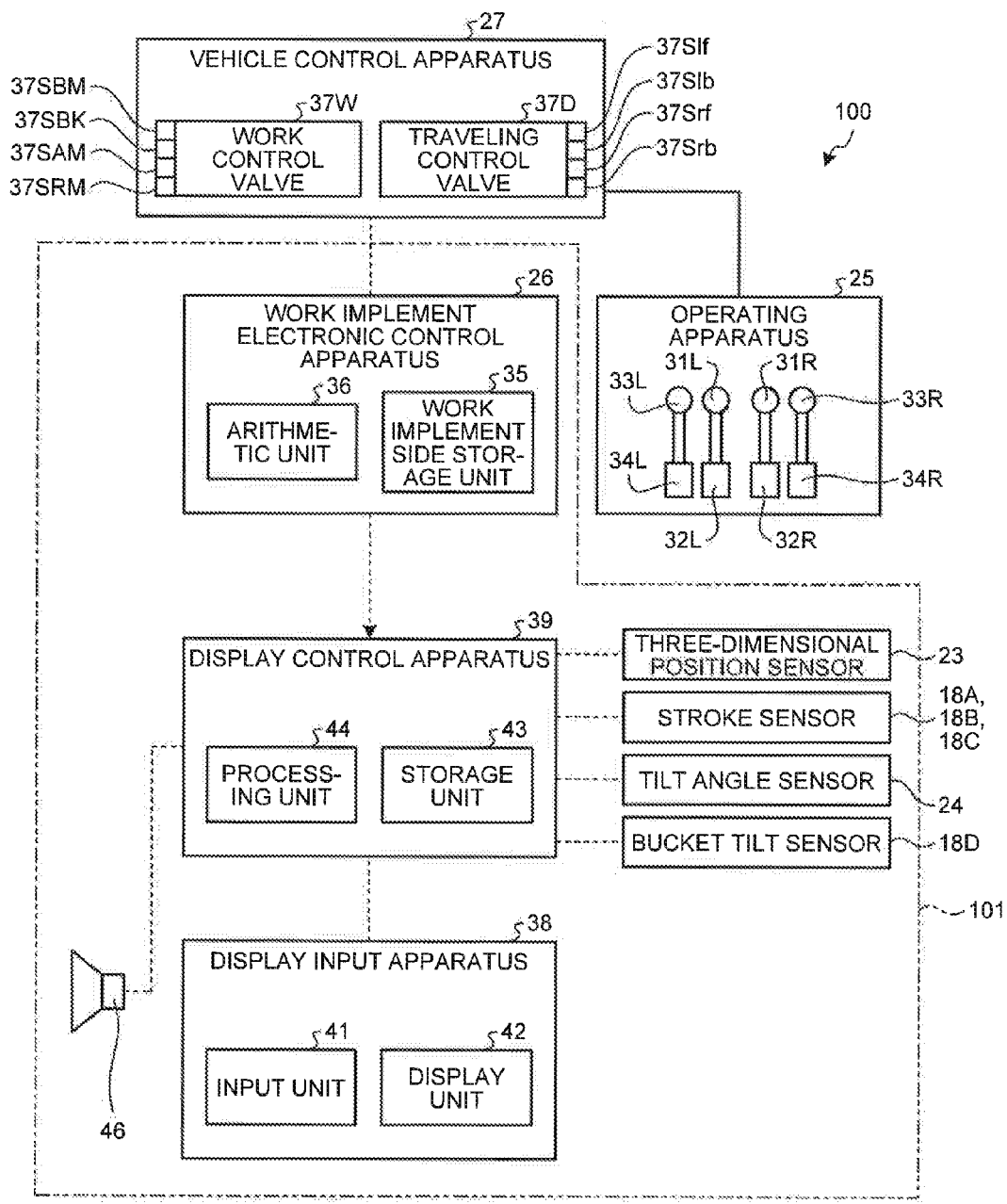
FIG. 6 is a block diagram illustrating a control system included in the excavator.
Figure 7:
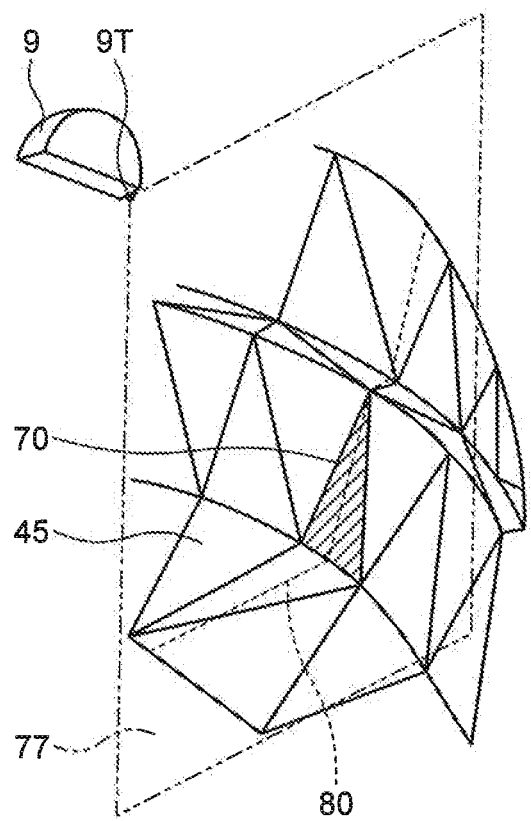
FIG. 7 is a diagram illustrating a design terrain represented by design terrain data.

FIG. 1 is a perspective view of an excavator 100 according to the present embodiment. FIG. 2 is a front view of a bucket 9 included in the excavator 100 according to the present embodiment. FIG. 3 is a perspective view of a bucket 9a according to another example included in the excavator 100 according to the present embodiment. FIG. 4 is a side view of the excavator 100. FIG. 5 is a rear view of the excavator 100. FIG. 6 is a block diagram illustrating a control system included in the excavator 100. FIG. 7 is a diagram illustrating a design terrain represented by design terrain data.

In the present embodiment, the excavator 100 serving as an excavating machine has a vehicle main body 1 serving as a main body unit; and a work implement 2. The vehicle main body 1 has an upper swing body 3 serving as a swing body; and a traveling apparatus 5. The upper swing body 3 includes, in an engine room 3EG, apparatuses such as a power generating apparatus and a hydraulic pump (not illustrated). The engine room 3EG is disposed on the one end side of the upper swing body 3.

Although in the present embodiment the excavator 100 uses an internal-combustion engine, e.g., a diesel engine, as the power generating apparatus, the excavator 100 is not limited thereto. The excavator 100 may include, for example, a so-called hybrid power generating apparatus where an internal-combustion engine, a generator motor, and a storage apparatus are combined together.

The upper swing body 3 has an operator cab 4. The operator cab 4 is placed on the other end side of the upper swing body 3. Namely, the operator cab 4 is disposed on the opposite side of the side where the engine room 3EG is disposed. In the operator cab 4, a display input apparatus 38 and an operating apparatus 25 which are illustrated in FIG. 6 are disposed. These apparatuses will be described later. The traveling apparatus 5 is provided underneath the upper swing body 3. The traveling apparatus 5 has tracks 5a and 5b. The traveling apparatus 5 travels by the tracks 5a and 5b turning by drive of a hydraulic motor (not illustrated), by which the excavator 100 travels. The work implement 2 is mounted on the lateral side of the operator cab 4 of the upper swing body 3.

Note that the excavator 100 may include a traveling apparatus that includes tires instead of the tracks 5a and 5b and that can travel by transmitting a driving force of a diesel engine (not illustrated) to the tires through a transmission. For example, the excavator 100 of such a mode may be a wheel type excavator.

The side of the upper swing body 3 where the work implement 2 and the operator cab 4 are disposed is the front, and the side of the upper swing body 3 where the engine room 3EG is disposed is the rear. The left side toward the front is the left of the upper swing body 3, and the right side toward the front is the right of the upper swing body 3. In addition, in the excavator 100 or the vehicle main body 1, its traveling apparatus 5's side with reference to the upper swing body 3 is the bottom, and its upper swing body 3's side with reference to the traveling apparatus 5 is the top. When the excavator 100 is placed on a horizontal plane, the bottom is the side of a vertical direction, i.e., the side of a gravity action direction, and the top is the opposite side of the vertical direction. Handrails 3G are provided on the upper swing body 3. As illustrated in FIG. 1, two antennas 21 and 22 for RTK-GNSS (Real Time Kinematic-Global Navigation Satellite Systems) (hereinafter, referred to as GNSS antennas 21 and 22, as appropriate) are detachably mounted on the handrails 3G.

The work implement 2 has a boom 6, an arm 7, the bucket 9, a boom cylinder 10, an arm cylinder 11, a bucket cylinder 12, and tilt cylinders 13. Note that an arrow SW and an arrow TIL illustrated in FIG. 1 or 2 indicate the directions in which the bucket 9 can rotate. A base end of the boom 6 is rotatably mounted on a front portion of the vehicle main body 1 through a boom pin 14. A base end of the arm 7 is rotatably mounted on a tip of the boom 6 through an arm pin 15. A linkage member 8 is mounted on a tip of the arm 7 through a bucket pin 16. The linkage member 8 is mounted on the bucket 9 through a tilt pin 17. The linkage member 8 is joined to the bucket cylinder 12 through a pin (not illustrated). By the bucket cylinder 12 extending and retracting, the bucket 9 rotates (see SW illustrated in FIG. 1). That is, the bucket 9 is mounted so as to be able to rotate about an axis orthogonal to an extending direction of the arm 7. The boom pin 14, the arm pin 15, and the bucket pin 16 are disposed in parallel positional relationship to one another. Namely, the central axes of the respective pins have a parallel positional relationship to one another.

Note that the term "orthogonal" described below refers to a positional relationship where two objects, such as two lines (or axes), a line (or an axis) and a plane, or a plane and a plane, are orthogonal to each other in space. For example, a state in which a plane containing one line (or axis) and a plane containing another line (or axis) are parallel to each other, and the one line and another line are orthogonal to each other when viewed in the direction perpendicular to either one of the planes is also represented that the one line and another line are orthogonal to each other. The same also applies to the case of a line (axis) and a plane and the case of a plane and a plane.

(Bucket 9)

In the present embodiment, the bucket 9 is one called a tilt bucket. The bucket 9 is joined to the arm 7 through the linkage member 8 and further through the bucket pin 16. Furthermore, the bucket 9 is mounted, through the tilt pin 17, on the bucket 9's side of the linkage member 8 which is opposite of the side where the bucket pin 16 of the linkage member 8 is mounted. The tilt pin 17 is orthogonal to the bucket pin 16. Namely, a plane containing the central axis of the tilt pin 17 is orthogonal to the central axis of the bucket pin 16. As such, the bucket 9 is mounted on the linkage member 8 through the tilt pin 17 so as to be able to rotate about the central axis of the tilt pin 17 (see the arrow TIL illustrated in FIGS. 1 and 2). By such a structure, the bucket 9 can rotate about the central axis (first axis) of the bucket pin 16 and can rotate about the central axis (second axis) of the tilt pin 17.

The central axis extending in an axial direction of the bucket pin 16 is a first axis AX1, and the central axis in an extending direction of the tilt pin 17 orthogonal to the bucket pin 16 is a tilt central axis (hereinafter, referred to as a second axis AX2, as appropriate)) orthogonal to the first axis AX1. Hence, the bucket 9 can rotate about the first axis AX1 and rotate about the second axis AX2. That is, when a third axis AX3 having an orthogonal positional relationship to both of the first axis AX1 and the second axis AX2 is used as a reference axis, the bucket 9 can rotate left and right (the arrow TIL illustrated in FIG. 2) with respect to the reference axis. Then, by rotating the bucket 9 either left or right, tooth edges 9T (more specifically, a tooth edge array 9TG) can be tilted with respect to the ground.

The bucket 9 includes a plurality of teeth 9B. The plurality of teeth 9B are mounted on an end of the bucket 9 that is on the opposite side of the side where the tilt pin 17 of the bucket 9 is mounted. The plurality of teeth 9B are arranged in a line in a direction orthogonal to the tilt pin 17, i.e., in parallel positional relationship to the first axis AX1. The tooth edges 9T are tips of the teeth 9B. in the present embodiment, the tooth edge array 9TG refers to the plurality of tooth edges 9T arranged side by side in a line. The tooth edge array 9TG is a set of the tooth edges 9T. In representing the tooth edge array 9TG, in the present embodiment, a straight line connecting the plurality of tooth edges 9T (hereinafter, referred to as a tooth edge array line, as appropriate) LBT is used.

The tilt cylinders 13 join the bucket 9 to the linkage member 8. Specifically, the tips of cylinder rods of the tilt cylinders 13 are joined to the main body side of the bucket 9, and the cylinder tube sides of the tilt cylinders 13 are joined to the linkage member 8. Although in the present embodiment the two tilt cylinders 13 and 13 join the bucket 9 and the linkage member 8 together on both of the left and right sides of the bucket 9 and the linkage member 8, at least one tilt cylinder 13 may join them together. When one tilt cylinder 13 extends, the other tilt cylinder 13 retracts, by which the bucket 9 rotates around the tilt pin 17. As a result, the tilt cylinders 13 and 13 can allow the tooth edges 9T, more specifically, the tooth edge array 9TG which is a set of the tooth edges 9T and is represented by the tooth edge array line LBT, to be tilted with respect to the third axis AX3.

Extension and retraction of the tilt cylinders 13 and 13 can be performed using an operating apparatus such as a slide switch or a foot-operated pedal (not illustrated) which is provided in the operator cab 4. When the operating apparatus is a slide switch, by the operator of the excavator 100 operating the slide switch, hydraulic oil is supplied to the tilt cylinders 13 and 13 or is discharged from the tilt cylinders 13 and 13, by which the tilt cylinders 13 and 13 extend or retract. As a result, the tilt bucket (bucket 9) rotates (the tooth edges 9T are tilted) left or right (the arrow TIL illustrated in FIG. 2) by an amount corresponding to the amount of the operation, with respect to the third axis AX3.

The bucket 9a illustrated in FIG. 3 is a type of tilt bucket, and is mainly used to work on slopes. The bucket 9a rotates about the central axis of the tilt pin 17. The bucket 9a includes a plate-like tooth 9Ba at its end on the opposite side of the side where the tilt pin 17 is mounted. A tooth edge 9Ta which is a tip of the tooth 9Ba is a linear portion that has a parallel positional relationship to a direction orthogonal to the central axis of the tilt pin 17, i.e., the first axis AX1 illustrated in FIG. 2, and that extends in a width direction of the bucket 9a. When the bucket 9a includes one tooth 9Ba, the tooth edge 9Ta and a tooth edge array 9TGa indicate the same location. In representing the tooth edge 9Ta or the tooth edge array 9TGa, in the present embodiment, a tooth edge array line LBT is used. The tooth edge array line LBT is a straight line in a direction in which the tooth edge 9Ta extends.

As illustrated in FIG. 4, the length of the boom 6, i.e., the length from the boom pin 14 to the arm pin 15, is L1. The length of the arm 7, i.e., the length from the center of the arm pin 15 to the center of the bucket pin 16, is L2. The length of the linkage member 8, i.e., the length from the center of the bucket pin 16 to the center of the tilt pin 17, is L3. The length L3 of the linkage member 8 is a radius at which the bucket 9 rotates about the central axis of the bucket pin 16. The length of the bucket 9, i.e., the length from the center of the tilt pin 17 to the tooth edges 9T of the bucket 9, is L4.

The boom cylinder 10, the arm cylinder 11, the bucket cylinder 12, and the tilt cylinders 13 illustrated in FIG. 1 each are a hydraulic cylinder that is driven by adjusting its extension and retraction and speed, according to the pressure of hydraulic oil (hereinafter, referred to as an oil pressure, as appropriate) or the flow rate of hydraulic oil. The boom cylinder 10 is to drive the boom 6, and allows the boom 6 to rotate up and down. The arm cylinder 11 is to drive the arm 7, and allows the arm 7 to rotate about the central axis of the arm pin 15. The bucket cylinder 12 is to drive the bucket 9, and allows the bucket 9 to rotate about the central axis of the bucket pin 16. Proportional control valves 37 illustrated in FIG. 6 are disposed between the hydraulic cylinders, such as the boom cylinder 10, the arm cylinder 11, the bucket cylinder 12, and the tilt cylinders 13, and the hydraulic pump (not illustrated). The flow rate of hydraulic oil supplied to the boom cylinder 10, the arm cylinder 11, the bucket cylinder 12, and the tilt cylinders 13 is controlled by a work implement electronic control apparatus 26 (described later) controlling the proportional control valves 37. As a result, the operation of the boom cylinder 10, the arm cylinder 11, the bucket cylinder 12, and the tilt cylinders 13 is controlled.

As illustrated in FIG. 4, the boom 6, the arm 7, and the bucket 9 are provided with a first stroke sensor 18A, a second stroke sensor 18B, and a third stroke sensor 18C and a bucket tilt sensor 18D serving as a bucket tilt detecting unit, respectively. The first stroke sensor 18A, the second stroke sensor 18B, and the third stroke sensor 18C are posture detecting units that detect posture of the work implement 2. The first stroke sensor 18A detects a stroke length of the boom cylinder 10. A display control apparatus 39 (see FIG. 6) (described later) calculates a tilt angle $\theta 1$ of the boom 6 with respect to the Za-axis of a vehicle main body coordinate system (described later), from the stroke length of the boom cylinder 10 detected by the first stroke sensor 18A. The second stroke sensor 18B detects a stroke length of the arm cylinder 11. The display control apparatus 39 calculates a tilt angle $\theta 2$ of the arm 7 with respect to the boom 6, from the stroke length of the arm cylinder 11 detected by the second stroke sensor 18B. The third stroke sensor 18C detects a stroke length of the bucket cylinder 12. The display control apparatus 39 calculates a tilt angle $\theta 3$ of the bucket 9 with respect to the arm 7, from the stroke length of the bucket cylinder 12 detected by the third stroke sensor 18C. The bucket tilt sensor 18D detects a tilt angle $\theta 4$ of the bucket 9, i.e., a tilt angle $\theta 4$ of the tooth edges 9T or the tooth edge array 9TG of the bucket 9 with respect to the third axis AX3. In the present embodiment, since, as described above, the tooth edge array 9TG is represented by the tooth edge array line LBT, the tilt angle $\theta 4$ of the bucket 9 is the tilt angle of the tooth edge array line LBT with respect to the third axis AX3 serving as a reference axis.

As illustrated in FIG. 4, the vehicle main body 1 includes a position detecting unit 19. The position detecting unit 19 detects the current position of the excavator 100. The position detecting unit 19 has the GNSS antennas 21 and 22, a three-dimensional position sensor 23, and a tilt angle sensor 24. The GNSS antennas 21 and 22 are placed on the vehicle main body 1, more specifically, the upper swing body 3. In the present embodiment, the GNSS antennas 21 and 22 are placed with a certain distance therebetween, along an axis line parallel to the Ya-axis of the vehicle main body coordinate system Xa-Ya-Za illustrated in FIGS. 4 and 5.

The upper swing body 3, and the work implement 2 and the bucket 9 which are mounted on the upper swing body 3 rotate about a predetermined swing central axis. The vehicle main body coordinate system Xa-Ya-Za is a coordinate system of the vehicle main body 1. In the vehicle main body coordinate system Xa-Ya-Za, the swing central axis of the work implement 2, etc., is the Za-axis, an axis orthogonal to the Za-axis and parallel to the operating plane of the work implement 2 is the Xa-axis, and an axis orthogonal to the Za-axis and the Xa-axis is the Ya-axis. The operating plane of the work implement 2 is, for example, a plane orthogonal to the boom pin 14. The Xa-axis corresponds to a front-rear direction of the upper swing body 3, and the Ya-axis corresponds to a width direction of the upper swing body 3.

It is preferred that the GNSS antennas 21 and 22 be placed on the upper swing body 3 and in both end positions distanced from each other in the front-rear direction (the Xa-axis direction of the vehicle main body coordinate system Xa-Ya-Za illustrated in FIGS. 4 and 5) or left-right direction (the Ya-axis direction of the vehicle main body coordinate system Xa-Ya-Za illustrated in FIGS. 4 and 5) of the excavator 100. As described above, in the present embodiment, as illustrated in FIG. 1, the GNS antennas 21 and 22 are mounted on the handrails 3G which are mounted on both sides in the width direction of the upper swing body 3. The positions in which the GNSS antennas 21 and 22 are mounted on the upper swing body 3 are not limited to the handrails 3G; however, it is preferred to place the GNSS antennas 21 and 22 in positions as far distanced from each other as possible because such positions improve the detection accuracy of the current position of the excavator 100. In addition, it is preferred to place the GNSS antennas 21 and 22 in positions where operator's visibility is not hindered as much as possible. The GNSS antennas 21 and 22 may be placed on the upper swing body 3 and on a counterweight (not illustrated) (at the rear end of the upper swing body 3) or at the rear of the operator cab 4.

Signals according to GNSS radio waves received by the GNSS antennas 21 and 22 are inputted to the three-dimensional position sensor 23. The three-dimensional position sensor 23 detects the positions of placement positions P1 and P2 of the GNSS antennas 21 and 22. As illustrated in FIG. 5, the tilt angle sensor 24 detects a tilt angle θ5 in the width direction of the vehicle main body 1 with respect to a direction in which gravity acts, i.e., a vertical direction Ng (hereinafter, referred to as a roll angle θ5, as appropriate). The tilt angle sensor 24 may be, for example, an IMU (Inertial Measurement Unit). In the present embodiment, the width direction of the bucket 9 is a direction parallel to the tooth edge array line LBT. When the bucket 9 is not tilted and when the bucket 9 does not have a tilt function, the width direction of the bucket 9 coincides with the width direction of the upper swing body 3, i.e., the left-right direction. When the bucket 9 rotates with respect to the third axis AX3, the width direction of the bucket 9 does not coincide with the width direction of the upper swing body 3. As described above, the position detecting unit 19 and the posture detecting units which serve as a vehicle state detecting unit can detect a vehicle state such as the current position and posture of the excavating machine (the excavator 100 in the present embodiment).

As illustrated in FIG. 6, the excavator 100 includes the operating apparatus 25, the work implement electronic control apparatus 26, a vehicle control apparatus 27, and a display system 101 for the excavating machine (hereinafter, referred to as a display system, as appropriate). The operating apparatus 25 has work implement operating members 31L and 31R and travel operating members 33L and 33R which serve as operating units; and work implement operation detecting units 32L and 32R and travel operation detecting units 34L and 34R. In the present embodiment, the work implement operating members 31L and 31R and the travel operating members 33L and 33R are pilot operated pressure levers, but are not limited thereto. The work implement operating members 31L and 31R and the travel operating members 33L and 33R may be, for example, electric operated levers. The work implement operation detecting units 32L and 32R and the travel operation detecting units 34L and 34R function as operation detecting units that detect inputs to the work implement operating members 31L and 31R and the travel operating members 33L and 33R which serve as the operating units.

The work implement operating members 31L and 31R are members used by the operator to operate the work implement 2, and are, for example, operating levers having a grip portion and a rod member, such as joysticks. The work implement operating members 31L and 31R of such a structure can be tilted back and forth and left to right by grabbing the grip portion. As illustrated in FIG. 4, there are two sets of the work implement operating members 31L and 31R and the work implement operation detecting units 32L and 32R. The work implement operating members 31L and 31R are respectively placed on the left and right of an operator's seat (not illustrated) in the operator cab 4. For example, by operating the work implement operating member 31L placed on the left, the arm 7 and the upper swing body 3 can be operated, and by operating the work implement operating member 31R placed on the right, the bucket 8 and the boom 6 can be operated.

The work implement operation detecting unit 32L, 32R generates a pilot pressure, according to an input, i.e., an operation content, to the work implement operating member 31L, 31R and supplies the generated hydraulic oil pilot pressure to a work control valve 37W included in the vehicle control apparatus 27. The work control valve 37W operates according to the magnitude of the pilot pressure, by which hydraulic oil is supplied from the hydraulic pump (not illustrated) to the boom cylinder 10, the arm cylinder 11, the bucket cylinder 12, and the like, illustrated in FIG. 1. When the work implement operating member 31L, 31R is an electric operated lever, the work implement operation detecting unit 32L, 32R detects an input, i.e., an operation content, to the work implement operating member 31L, 31R using, for example, a potentiometer, and converts the input into an electrical signal (detection signal) and then sends the electrical signal to the work implement electronic control apparatus 26. The work implement electronic control apparatus 26 controls the work control valve 37W, based on the detection signal.

The travel operating members 33L and 33R are members used by the operator to operate travel of the excavator 100. The travel operating members 33L and 33R are, for example, operating levers having a grip portion and a rod member (hereinafter, referred to as traveling levers, as appropriate). Such travel operating members 33L and 33R can be tilted back and forth by the operator grabbing the grip portion. The travel operating members 33L and 33R are such that by simultaneously tilting the two operating levers forward, the excavator 100 moves forward, and by tilting backward, the excavator 100 moves backward. Alternatively, the travel operating members 33L and 33R are seesaw pedals (not illustrated) operable by the operator stepping on the pedals with his/her feet. By stepping on either the front side or rear side of the pedals, a pilot pressure is generated as with the operating levers described above, by which a traveling control valve 37D is controlled and hydraulic motors 5c are driven, and the excavator 100 can move forward or backward. By simultaneously stepping on the front side of the two pedals, the excavator 100 moves forward, and by stepping on the rear side, the excavator 100 moves backward. Alternatively, by stepping on the front or rear side of one pedal, only one side of the tracks 5a and 5b turns, by which the excavator 100 can swing. As such, when the operator wants the excavator 100 to travel, by performing either operation, tilting the operating levers back and forth with his/her hands or stepping on the front side or rear side of the pedals with his/her feet, he/she can drive the hydraulic motors 5c of the traveling apparatus 5. As illustrated in FIG. 4, there are two sets of the travel operating members 33L and 33R and the travel operation detecting units 34L and 34R. The travel operating members 33L and 33R are placed side by side on the left and right of the front area of the operator's seat (not illustrated) in the operator cab 4. By operating the travel operating member 33L placed on the left side, the hydraulic motor 5c on the left side is driven, by which the track 5b on the left side can be operated. By operating the travel operating member 33R placed on the right side, the hydraulic motor 5c on the right side is driven, by which the track 5a on the right side can be operated.

The travel operation detecting unit 34L, 34R generates a pilot pressure, according to an input, i.e., an operation content, to the travel operating member 33L, 33R and supplies the generated pilot pressure to the traveling control valve 37D included in the vehicle control apparatus 27. The traveling control valve 37D operates according to the magnitude of the pilot pressure, by which hydraulic oil is supplied to the traveling hydraulic motor 5c. When the travel operating member 33L, 33R is an electric operated lever, the travel operation detecting unit 34L, 34R detects an input, i.e., an operation content, to the travel operating member 33L, 33R using, for example, a potentiometer, and converts the input into an electrical signal (detection signal) and then sends the electrical signal to the work implement electronic control apparatus 26. The work implement electronic control apparatus 26 controls the traveling control valve 37D, based on the detection signal.

As illustrated in FIG. 6, the work implement electronic control apparatus 26 has a work implement side storage unit 35 including at least one of a RAM (Random Access Memory) and a ROM (Read Only Memory); and an arithmetic unit 36 such as a CPU (Central Processing Unit). The work implement electronic control apparatus 26 mainly controls the operation of the work implement 2 and the upper swing body 3. The work implement side storage unit 35 stores a computer program for controlling the work implement 2, a display computer program for the excavating machine according to the present embodiment, information on the coordinates of the vehicle main body coordinate system, and the like. Although in the display system 101 illustrated in FIG. 6 the work implement electronic control apparatus 26 and the display control apparatus 39 are separated from each other, the configuration is not limited thereto. For example, in the display system 101, the work implement electronic control apparatus 26 and the display control apparatus 39 may be integrated into a single control apparatus, instead of being separated from each other.

The vehicle control apparatus 27 is a hydraulic device including hydraulic control valves, etc., and has the traveling control valve 37D and the work control valve 37W. These valves are proportional control valves, and are controlled by pilot pressures from the work implement operation detecting units 32L and 32R and the travel operation detecting units 34L and 34R. When the work implement operating members 31L and 31R and the travel operating members 33L and 33R are electric operated levers, the traveling control valve 37D and the work control valve 37W are controlled based on control signals from the work implement electronic control apparatus 26.

In the case in which the travel operating members 33L and 33R are pilot pressure operated traveling levers, when the operator of the excavator 100 operates the travel operating members 33L and 33R by providing inputs thereto, hydraulic oil with a flow rate according to pilot pressures from the travel operation detecting units 34L and 34R flows out of the traveling control valve 37D, and is supplied to the traveling hydraulic motors 5c. When one or both of the travel operating members 33L and 33R is(are) operated, one or both of the left and right hydraulic motors 5c illustrated in FIG. 1 is(are) driven. As a result, at least one of the tracks 5a and 5b turns and thus the excavator 100 travels.

The vehicle control apparatus 27 includes hydraulic sensors 37Slf, 37Slb, 37Srf, and 37Srb that detect magnitudes of pilot pressures to be supplied to the traveling control valve 37D, and generate corresponding electrical signals. The hydraulic sensor 37Slf detects a pilot pressure for left-forward movement, the hydraulic sensor 37Slb detects a pilot pressure for left-backward movement, the hydraulic sensor 37Srf detects a pilot pressure for right-forward movement, and the hydraulic sensor 37Srb detects a pilot pressure for right-backward movement. The work implement electronic control apparatus 26 obtains an electrical signal indicating the magnitude of a hydraulic oil pilot pressure detected and generated by the hydraulic sensor 37Slf, 37Slb, 37Srf, or 37Srb. The electrical signal is used for control of the engine or the hydraulic pump, operation of a construction management apparatus (described later), or the like. As described above, in the present embodiment, the work implement operating members 31L and 31R and the travel operating members 33L and 33R are pilot pressure operated levers. In this case, the hydraulic sensors 37Slf, 37Slb, 37Srf, and 37Srb and hydraulic sensors 37SBM, 37SBK, 37SAM, and 37SRM (described later) function as operation detecting units that detect inputs to the work implement operating members 31L and 31R and the travel operating members 33L and 33R which serve as the operating units.

In the case in which the work implement operating members 31L and 31R are pilot pressure operated operating levers, when the operator of the excavator 100 operates the operating lever, hydraulic oil with a flow rate corresponding to a pilot pressure generated according to the operation performed on the work implement operating member 31L, 31R flows out of the work control valve 37W. The hydraulic oil having flown out of the work control valve 37W is supplied to at least one of the boom cylinder 10, the arm cylinder 11, the bucket cylinder 12, and a swing motor. Then, in at least one of the boom cylinder 10, the arm cylinder 11, and the bucket cylinder 12 illustrated in FIG. 1 and the swing motor, each cylinder performs extension and retraction operation and the swing motor is swing-driven, according to the hydraulic oil supplied from the work control valve 37W. As a result, at least one of the work implement 2 and the upper swing body 3 operates.

The vehicle control apparatus 27 includes the hydraulic sensors 37SBM, 37SBK, 37SAM, and 37SRM that detect magnitudes of pilot pressures to be supplied to the work control valve 37W, and generate electrical signals. The hydraulic sensor 37SBM detects a pilot pressure for the boom cylinder 10, the hydraulic sensor 37SBK detects a pilot pressure for the arm cylinder 11, the hydraulic sensor 37SAM detects a pilot pressure for the bucket cylinder 12, and the hydraulic sensor 37SRM detects a pilot pressure for the swing motor. The work implement electronic control apparatus 26 obtains an electrical signal indicating the magnitude of a pilot pressure detected and generated by the hydraulic sensor 37SBM, 37SBK, 37SAM, or 37SRM. The electrical signal is used for control of the engine or the hydraulic pump, etc.

Although in the present embodiment the work implement operating members 31L and 31R and the travel operating members 33L and 33R are pilot pressure operated operating levers, they may be electric operated levers. In this case, the work implement electronic control apparatus 26 generates a control signal for allowing the work implement 2, the upper swing body 3, or the traveling apparatus 5 to operate, according to an operation performed on the work implement operating member 31L, 31R or the travel operating member 33L, 33R, and outputs the control signal to the vehicle control apparatus 27.

In the vehicle control apparatus 27, the work control valve 37W and the traveling control valve 37D are controlled based on control signals from the work implement electronic control apparatus 26. Hydraulic oil with a flow rate according to a control signal from the work implement electronic control apparatus 26 flows out of the work control valve 37W, and is supplied to at least one of the boom cylinder 10, the arm cylinder 11, and the bucket cylinder 12. The boom cylinder 10, the arm cylinder 11, the bucket cylinder 12, and the tilt cylinders 13 illustrated in FIG. 1 are driven according to the hydraulic oil supplied from the work control valve 37W. As a result, the work implement 2 operates.

<Display System 101>

The display system 101 is a system for providing the operator with information for working on the ground in a work area to obtain a shape such as design planes (described later) by excavating the ground by the excavator 100. The display system 101 includes stroke sensors such as the first stroke sensor 18A, the second stroke sensor 18B, and the third stroke sensor 18C, the display input apparatus 38 serving as a display apparatus, the display control apparatus 39, the work implement electronic control apparatus 26, and a sound generating apparatus 46 including a speaker for sounding an audible alarm, etc., in addition to the above-described three-dimensional position sensor 23, tilt angle sensor 24, and bucket tilt sensor 18D. In addition, the display system 101 includes the position detecting unit 19 illustrated in FIG. 4. For convenience sake, of the components of the position detecting unit 19, the three-dimensional position sensor 23 and the tilt angle sensor 24 are illustrated in FIG. 6, and the two antennas 21 and 22 are omitted.

The display input apparatus 38 is a display apparatus having a touch panel type input unit 41 and a display unit 42 such as an LCD (Liquid Crystal Display). The display input apparatus 38 displays a guidance screen for providing the operator with information for performing excavation. In addition, various types of keys are displayed on the guidance screen. The operator (a service person when the excavator 100 is checked or repaired) serving as an operator can allow various types of functions of the display system 101 to be performed by touching various types of keys on the guidance screen. The guidance screen will be described later.

The display control apparatus 39 performs various types of functions of the display system 101. The display control apparatus 39 is an electronic control apparatus having a storage unit 43 including at least one of a RAM and a ROM; and a processing unit 44 such as a CPU. The storage unit 43 stores work implement data. The work implement data includes the above-described length L1 of the boom 6, length L2 of the arm 7, length L3 of the linkage member 8, and length L4 of the bucket 9. When the bucket 9 is replaced with another bucket, values of the length L3 of the linkage member 8 and the length L4 of the bucket 9 which are work implement data, according to the dimensions of another bucket 9 are inputted from the input unit 41 and stored in the storage unit 43. In addition, the work implement data includes minimum values and maximum values of each of the tilt angle θ1 of the boom 6, the tilt angle θ2 of the arm 7, and the tilt angle θ3 of the bucket 9. The storage unit 43 stores a display computer program for the excavator 100, i.e., the excavating machine. By the processing unit 44 reading and executing the display computer program for the excavating machine according to the present embodiment, which is stored in the storage unit 43, the processing unit 44 displays a guidance screen or displays posture information for guiding the operator of the excavator 100 on the operations of the bucket 9, on the display unit 42 serving as a display apparatus.

The display control apparatus 39 and the work implement electronic control apparatus 26 can communicate with each other through a wireless or wired communication means. The storage unit 43 of the display control apparatus 39 stores design terrain data generated in advance. The design terrain data is information about the shape and position of a three-dimensional design terrain, and is information on design planes 45. The design terrain represents a target shape of the ground which is a work object. The display control apparatus 39 displays a guidance screen on the display input apparatus 38, based on the design terrain data and information such as detection results from the above-described various types of sensors. Specifically, as illustrated in FIG. 7, a design terrain is composed of a plurality of design planes 45 each represented by a triangle polygon. Note that, in FIG. 7, of the plurality of design planes, only one design plane is given reference sign 45 and reference signs for other design planes are omitted. The target work object is one or a plurality of design planes of the design planes 45. The operator selects one or a plurality of design planes 45 from among the design plane 45, as a target plane(s) 70. The target plane 70 is a plane to be excavated from now on among the plurality of design planes 45. The display control apparatus 39 displays a guidance screen for notifying the operator of the position of the target plane 70, on the display input apparatus 38.

<Guidance Screen>

Figure 8:
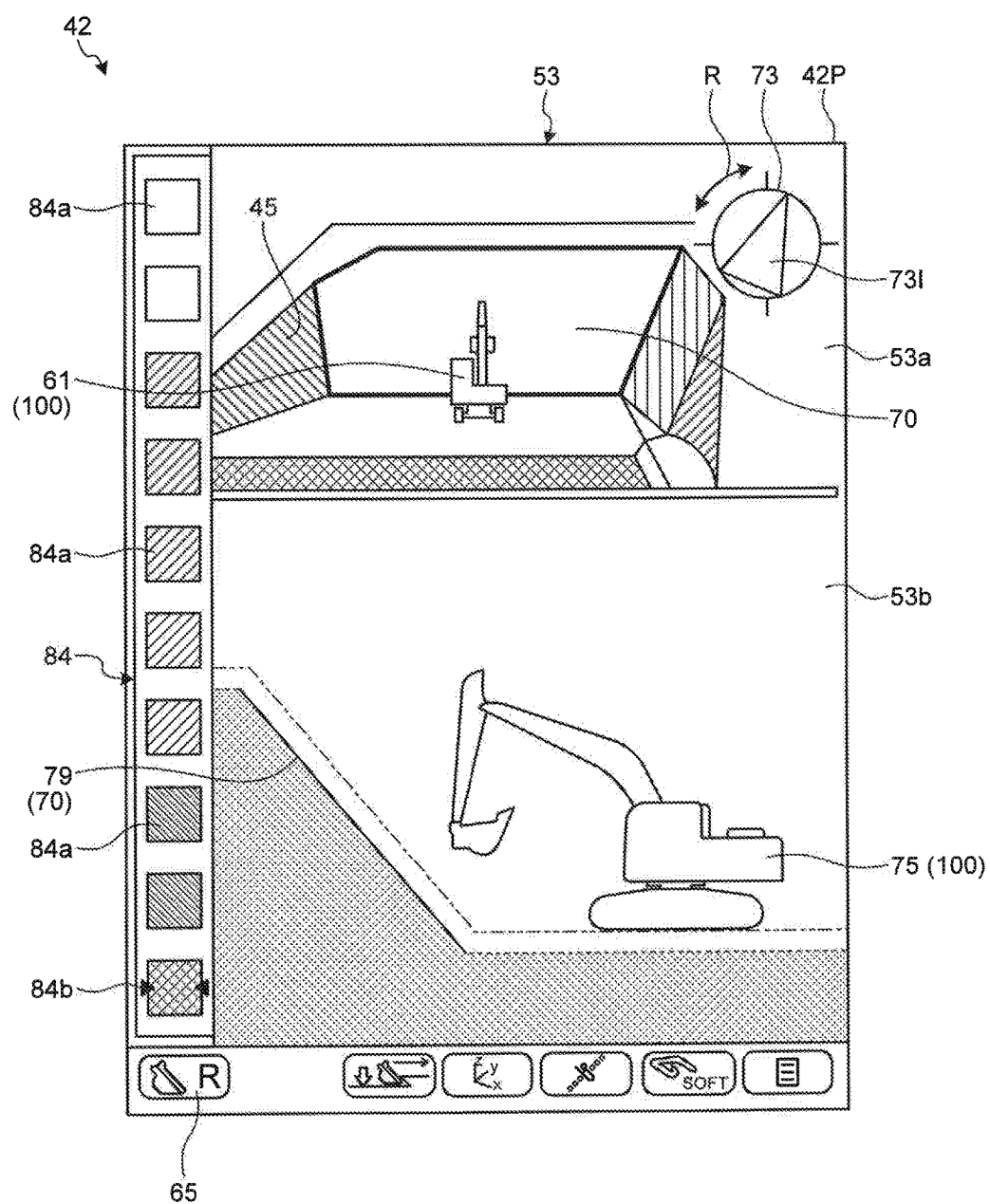
FIG. 8 is a diagram illustrating an example of a guidance screen.
Figure 9:
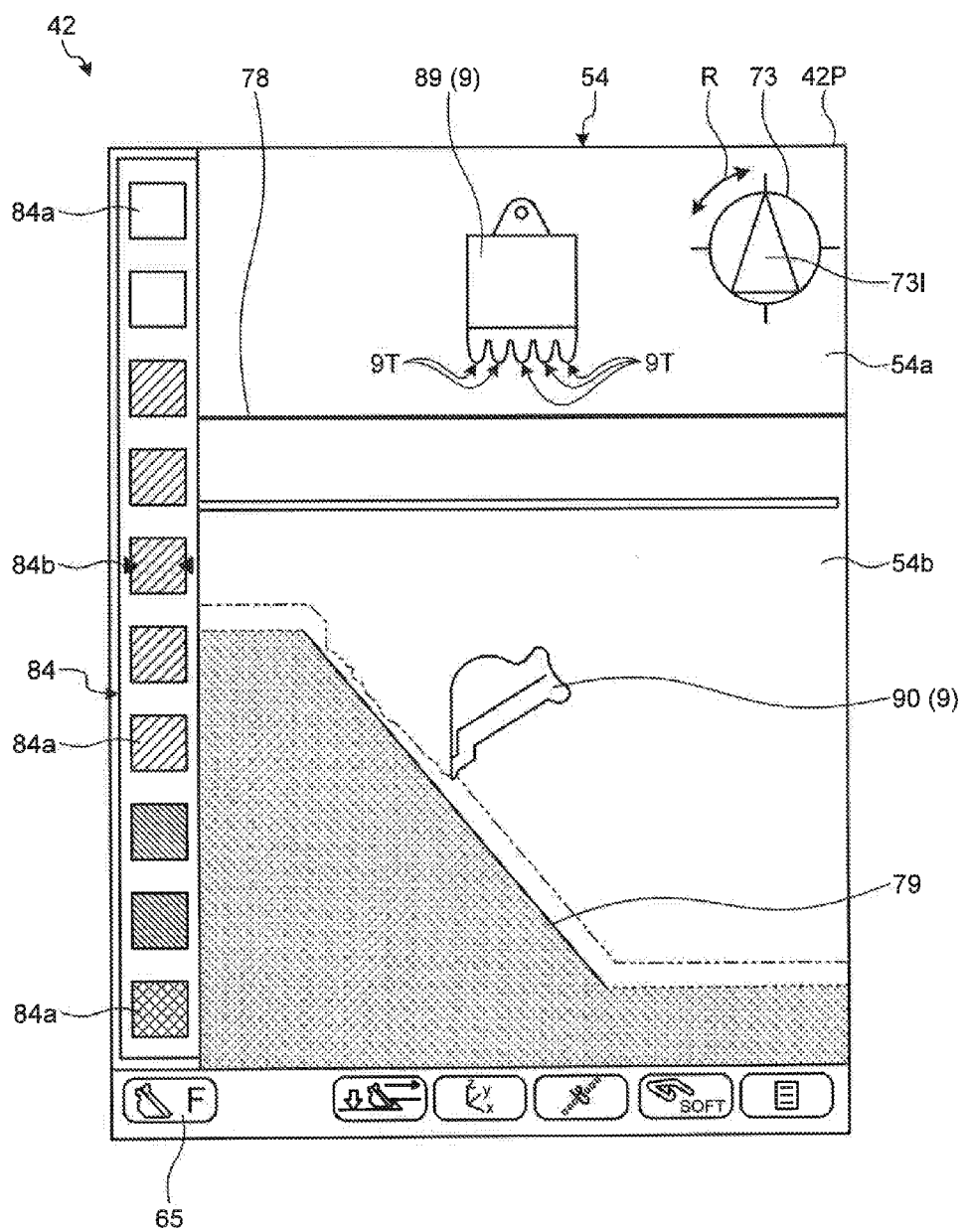
FIG. 9 is a diagram illustrating an example of a guidance screen.

FIGS. 8 and 9 are diagrams illustrating examples of guidance screens. A guidance screen is a screen showing a positional relationship between a target plane 70 and the tooth edges 9T of the bucket 9 to provide the operator of the excavator 100 guidance on the operations of the work implement 2 such that the ground which is a work object obtains the same shape as the target plane 70. As illustrated in FIGS. 8 and 9, the guidance screens include a guidance screen in a rough excavation mode (hereinafter, referred to as a rough excavation screen 53, as appropriate) and a guidance screen in a fine excavation mode (hereinafter, referred to as a fine excavation screen 54, as appropriate).

(Example of the Rough Excavation Screen 53)

The rough excavation screen 53 illustrated in FIG. 8 is displayed on a screen 42P of the display unit 42. The rough excavation screen 53 includes a front view 53a showing a design terrain of a work area (design planes 45 including a target plane 70) and the current position of the excavator 100; and a side view 53b showing a positional relationship between the target plane 70 and the excavator 100. The front view 53a of the rough excavation screen 53 represents a front-viewed design terrain by a plurality of triangle polygons. As illustrated in the front view 53a of FIG. 8, the display control apparatus 39 collectively displays a plurality of triangle polygons as the design planes 45 or the target plane 70, on the display unit 42. FIG. 8 illustrates a state in which, in the case of the design terrain having a slope, the excavator 100 faces the slope. Therefore, in the front view 53a, when the excavator 100 is tilted, the design planes 45 representing the design terrain are also tilted.

In addition, the target plane 70 which is selected as a target work object from among the plurality of design planes 45 (only one design plane is given reference sign in FIG. 8) is displayed in a different color than other design planes 45. Note that in the front view 53a of FIG. 8 the current position of the excavator 100 is indicated by an icon 61 as viewed from the back of the excavator 100, but may be indicated by other symbols. Note also that the front view 53a includes information for allowing the excavator 100 to face the target plane 70. The information for allowing the excavator 100 to face the target plane 70 is displayed as a facing compass 73. The facing compass 73 is, for example, posture information, such as a picture or an icon, in which an arrow-shaped pointer 73I rotates in the manner indicated by an arrow R, to provide guidance on the direction of facing the target plane 70 and the direction in which the excavator 100 is to swing or the direction in which the bucket 9 is tilted with respect to the third axis AX3. The posture information is information about the posture of the bucket 9, and includes a picture, a numerical value, a numerical number, or the like. Note that to allow the excavator 100 to face the target plane 70, the traveling apparatus 5 may be allowed to operate to move the excavator 100 to face the target plane 70. The operator of the excavator 100 can check the degree of facing the target plane 70 by the facing compass 73. The facing compass 73 rotates according to the degree of facing the target plane 70. When the excavator 100 or the bucket 9 faces the target plane 70, for example, the indication direction of the pointer 73I is directed upward on the screen 42P, as viewed from the operator. For example, when, as illustrated in FIG. 8, the pointer 73I has a triangular shape, the more upward the direction pointed by the apex of the triangle is indicative of a higher degree of facing of the excavator 100 or the bucket 9 with respect to the target plane 70. Hence, the operator can easily allow the excavator 100 or the bucket 9 to face the target plane 70 by operating the excavator 100, based on the rotation angle of the pointer 73I.

The side view 53b of the rough excavation screen 53 includes an image representing a positional relationship between the target plane 70 and the tooth edges 9T of the bucket 9; and distance information indicating the distance between the target plane 70 and the tooth edges 9T of the bucket 9. Specifically, the side view 53b includes a target plane line 79 and an icon 75 of the side-viewed excavator 100. The target plane line 79 indicates a cross section of the target plane 70. The target plane line 79 is obtained, as illustrated in FIG. 7, by calculating a line of intersection 80 of a plane 77 passing through the current position of the tooth edges 9T of the bucket 9 and a design plane 45. The line of intersection 80 is obtained by the processing unit 44 of the display control apparatus 39. A method for determining the current position of the tooth edges 9T of the bucket 9 will be described later.

In the side view 53b, the distance information indicating the distance between the target plane 70 and the tooth edges 9T of the bucket 9 includes graphics information 84. The distance between the target plane 70 and the tooth edges 9T of the bucket 9 is a distance between a point where a line dropped from the tooth edges 9T toward the target plane 70 in a vertical direction (gravity direction) intersects the target plane 70 and the tooth edges 9T. Alternatively, the distance between the target plane 70 and the tooth edges 9T of the bucket 9 may be a distance between an intersection point obtained when a perpendicular line is dropped from the tooth edges 9T to the target plane 70 (the perpendicular line is orthogonal to the target plane 70) and the tooth edges 9T. The graphics information 84 is information indicating, by graphics, the distance between the tooth edges 9T of the bucket 9 and the target plane 70. The graphics information 84 is a guidance index for indicating the position of the tooth edges 9T of the bucket 9. Specifically, the graphics information 84 includes index bars 84a and an index mark 84b indicating a position corresponding to a zero distance between the tooth edges of the bucket 9 and the target plane 70 among the index bars 84a. The index bars 84a are such that each index bar 84a lights up according to the shortest distance between the tip of the bucket 9 and the target plane 70. Note that the configuration may be such that the on/off of display of the graphics information 84 can be changed by an operation performed on the input unit 41 by the operator of the excavator 100.

A distance (numerical value) (not illustrated) may be displayed on the rough excavation screen 53 to show a positional relationship between the target plane line 79 and the excavator 100 such as that described above. The operator of the excavator 100 can easily perform excavation such that the current terrain becomes the design terrain, by moving the tooth edges 9T of the bucket 9 along the target plane line 79. Note that a screen switching key 65 for switching the guidance screen is displayed on the rough excavation screen 53. The operator can switch from the rough excavation screen 53 to the fine excavation screen 54 by operating the screen switching key 65.

(Example of the Fine Excavation Screen 54)

The fine excavation screen 54 illustrated in FIG. 9 is displayed on the screen 42P of the display unit 42. The fine excavation screen 54 shows a state in which the tooth edges 9T of the bucket 9 is facing the target plane 70.

The fine excavation screen 54 shows a positional relationship between the target plane 70 and the excavator 100 in more detail than the rough excavation screen 53. Specifically, the fine excavation screen 54 shows a positional relationship between the target plane 70 and the tooth edges 9T of the bucket 9 in more detail than the rough excavation screen 53. The fine excavation screen 54 includes a front view 54a showing the target plane 70 and the bucket 9; and a side view 54b showing the target plane 70 and the bucket 9. The front view 54a of the fine excavation screen 54 includes an icon 89 representing the front-viewed bucket 9, and a line 78 representing a cross-section of the front-viewed target plane 70 (hereinafter, referred to as the front-viewed target plane line 78, as appropriate). The term "front-viewed" refers to viewing of the bucket 9 from the rear of the excavator 100 in a direction orthogonal to the extending direction of the central axis of the bucket pin 16 (the direction of the central axis of rotation of the bucket 9) illustrated in FIGS. 1 and 2.

The front-viewed target plane line 78 is obtained as follows. When a perpendicular line is dropped from the tooth edges 9T of the bucket 9 in a vertical direction (gravity direction), a line of intersection formed when a plane containing the perpendicular line intersects the target plane 70 is the front-viewed target plane line 78.

Namely, the line of intersection is the front-viewed target plane line 78 in a global coordinate system. On the other hand, on condition that there is a parallel positional relationship to a line in a top-bottom direction of the vehicle main body 1, furthermore, when a line is dropped from the tooth edges 9T of the bucket 9 toward the target plane 70, a line of intersection formed when a plane containing the line intersects the target plane 70 may be the front-viewed target plane line 78. Namely, the line of intersection is the front-viewed target plane line 78 in the vehicle main body coordinate system. In which coordinate system the front-viewed target plane line 78 is to be displayed can be selected by the operator operating a switching key (not illustrated) of the input unit 41.

The side view 54b of the fine excavation screen 54 includes an icon 90 of the side-viewed bucket 9; and a target plane line 79. In addition, information indicating a positional relationship between the target plane 70 and the bucket 9, such as that described next, is displayed on each of the front view 54a and the side view 54b of the fine excavation screen 54. The term "side-viewed" refers to viewing from the extending direction of the central axis of the bucket pin 16 (the direction of the central axis of rotation of the bucket 9) illustrated in FIGS. 1 and 2, and viewing from either one of the left and right sides of the excavator 100. In the present embodiment, the term "side-viewed" refers to the case of viewing from the left side of the excavator 100.

The front view 54a may include distance information indicating the distance in the Za-direction of the vehicle main body coordinate system (or the Z-direction of the global coordinate system) between the tooth edges 9T and the target plane 70, as information indicating a positional relationship between the target plane 70 and the bucket 9. The distance is a distance between the closest position to the target plane 70 among positions in the width direction of the tooth edges 9T of the bucket 9, and the target plane 70. Namely, as described above, the distance between the target plane 70 and the tooth edges 9T of the bucket 9 may be a distance between a point where a line dropped from the tooth edges 9T toward the target plane 70 in the vertical direction intersects the target plane 70 and the tooth edges 9T. Alternatively, the distance between the target plane 70 and the tooth edges 9T of the bucket 9 may be a distance between an intersection point obtained when a perpendicular line is dropped from the tooth edges 9T to the target plane 70 (the perpendicular line is orthogonal to the target plane 70) and the tooth edges 9T.

The fine excavation screen 54 includes graphics information 84 indicating, by graphics, the above-described distance between the tooth edges 9T of the bucket 9 and the target plane 70. As with the graphics information 84 of the rough excavation screen 53, the graphics information 84 has index bars 84a and an index mark 84b. As described above, a relative positional relationship between the front-viewed target plane line 78 and the target plane line 79 and the tooth edges 9T of the bucket 9 is displayed in detail on the fine excavation screen 54. The operator of the excavator 100 can more easily and accurately perform excavation such that the current terrain obtains the same shape as the three-dimensional design terrain, by moving the tooth edges 9T of the bucket 9 along the front-viewed target plane line 78 and the target plane line 79. Note that, as with the above-described rough excavation screen 53, a screen switching key 65 is displayed on the fine excavation screen 54. The operator can switch from the fine excavation screen 54 to the rough excavation screen 53 by operating the screen switching key 65.

Next, a display method for the excavating machine according to the present embodiment will be described. The display method is implemented by the display control apparatus 39 included in the display system 101 illustrated in FIG. 6. The display control apparatus 39 performs, as a display method for the excavating machine according to the present embodiment, control to display posture information (e.g., a picture, a numerical value, or a numerical number) for providing an operation index to the operator of the excavator 100, on the screen 42P of the display unit 42 (hereinafter, referred to as posture information display control, as appropriate).

<Example of Posture Information Display Control>

Figure 10:
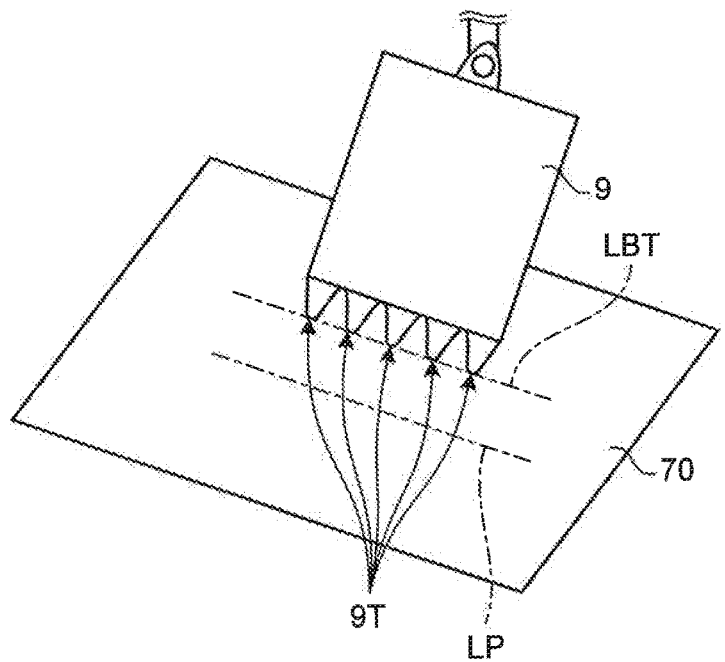
FIG. 10 is a diagram for describing that the bucket faces a target plane.
Figure 11:
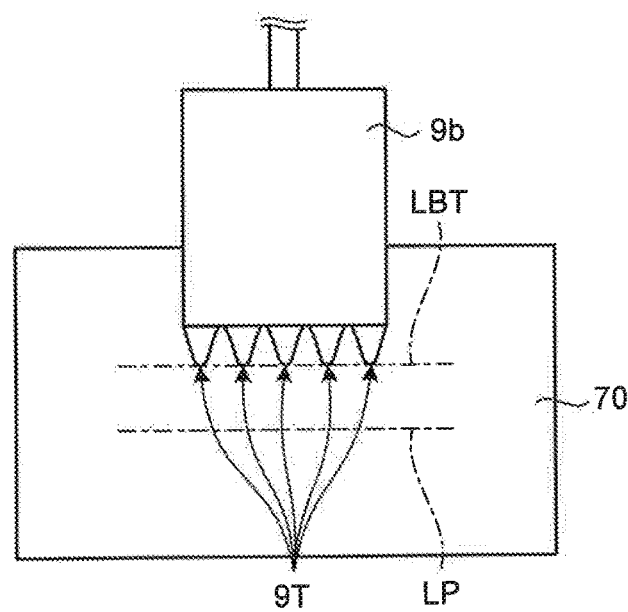
FIG. 11 is a diagram for describing that the bucket faces the target plane.

FIGS. 10 and 11 are diagrams for describing that the bucket 9 faces a target plane 70. The bucket 9 illustrated in FIG. 10 has a tilt function, and a bucket 9a illustrated in FIG. 11 is a normal bucket that does not have a tilt function.

Posture information display control is control for assisting in operator's operations on the excavator 100, by moving the pointer 73I of the facing compass 73 illustrated in FIGS. 8 and 9, when allowing the tooth edges 9T of the bucket 9 to face the target plane 70. The expression "the tooth edges 9T of the bucket 9 face the target plane 70" refers to a state in which the tooth edge array line LBT which is a straight line connecting the tooth edges 9T of the bucket 9 is parallel to the target plane 70. This indicates that a straight line LP parallel to the tooth edge array line LBT can be drawn on a surface of the target plane 70.

When the tooth edges 9T of the bucket 9 illustrated in FIG. 10 face the target plane 70, the operator cab 4 of the excavator 100 illustrated in FIG. 1 is not always located in front of the target plane 70. On the other hand, when tooth edges 9T of the bucket 9b with no tilt function illustrated in FIG. 11 face the target plane 70, the operator cab 4 of the excavator 100 is located in front of the target plane 70. By moving the boom 6, the arm 7, or the bucket 9b up and down or back and forth with the tooth edges 9T of the bucket 9b with no tilt function facing the target plane 70, an excavation object can be excavated along the target plane 70.

Figure 12:
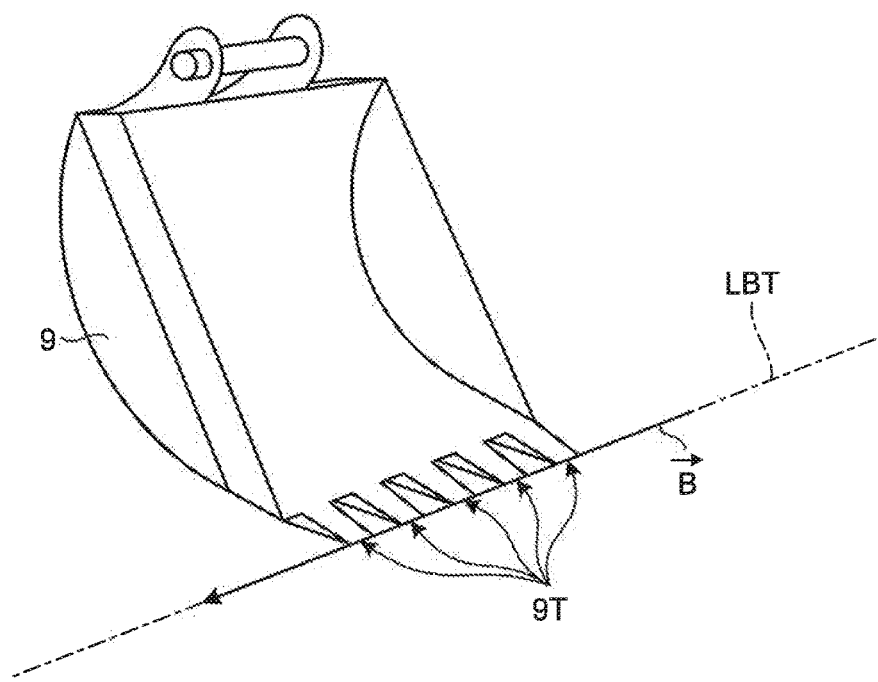
FIG. 12 is a diagram for describing a tooth edge vector.
Figure 13:
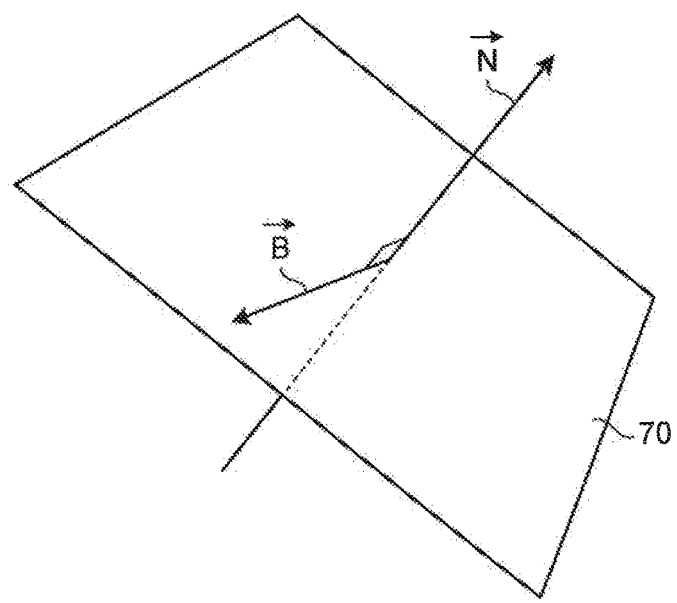
FIG. 13 is a diagram illustrating a normal vector of the target plane.
Figure 14:
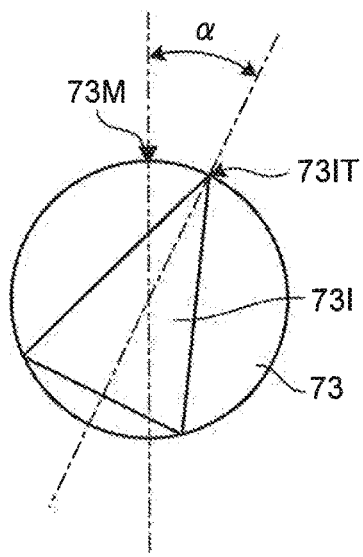
FIG. 14 is a diagram illustrating a relationship between a facing compass and a target rotation angle.

FIG. 12 is a diagram for describing a tooth edge vector B. FIG. 13 is a diagram illustrating a normal vector N of a target plane 70. FIG. 14 is a diagram illustrating a relationship between the facing compass 73 and a target rotation angle α. The tooth edge vector B illustrated in FIG. 12 is a vector parallel to the tooth edge array line LBT of the bucket 9. Namely, the tooth edge vector B is a vector having a direction in which the tooth edges 9T of the bucket 9 are connected, and a predetermined magnitude. The tooth edge vector B is information including the direction of the tooth edges 9T of the bucket 9. The direction of the tooth edges 9T of the bucket 9 can be determined based on information about the current position and posture of the excavator 100.

The normal vector N illustrated in FIG. 13 is a vector having a direction orthogonal to the target plane 70, and a predetermined magnitude. The normal vector N is information including the direction orthogonal to the target plane 70. The expression "the tooth edges 9T of the bucket 9 face the target plane 70" refers to that the tooth edge vector B of the bucket 9 is orthogonal to the normal vector N of the target plane 70. The same also applies to the bucket 9b with no tilt function illustrated in FIG. 11.

In the posture information display control, the amount of swing (hereinafter, referred to as the amount of rotation, as appropriate) of the upper swing body 3 including the work implement 2 having the bucket 9, which is required for the tooth edge vector B of the bucket 9 to become orthogonal to the normal vector N of the target plane 70 is determined. In the present embodiment, the amount of rotation is referred to as the target amount of rotation, and information indicating the target amount of rotation is referred to as target swing information. The target amount of rotation is, for example, the angle of swing (hereinafter, referred to as a rotation angle, as appropriate) around the swing central axis of the upper swing body 3 including the work implement 2, which is required for the tooth edges 9T of the bucket 9 to become parallel to the target plane 70. The rotation angle is referred to as a target rotation angle, as appropriate.

In the posture information display control, as illustrated in FIG. 14, the pointer 73I of the facing compass 73 is allowed to rotate based on the determined target rotation angle. The angle α in FIG. 14 is the target rotation angle. Since the direction of the tooth edge vector B of the bucket 9 changes as the upper swing body 3 including the work implement 2 swings, the target rotation angle α also changes according to the rotation angle of the upper swing body 3 including the work implement 2. As a result, the upper swing body 3 including the work implement 2 swings, and the pointer 73i of the facing compass 73 also rotates.

The facing compass 73 is provided with, for example, a facing mark 73M at the top thereof. When the tooth edges 9T of the bucket 9 face the target plane 70, the pointer 73I rotates and the position of a top 73IT coincides with the position of the facing mark 73M. The operator of the excavator can grasp that the tooth edges 9T of the bucket 9 have faced the target plane 70, by the position of the top 73IT of the pointer 73I coinciding with the position of the facing mark 73M.

In the present embodiment, in the facing compass 73 serving as posture information, the mode of the facing compass 73 displayed on the display unit 42 of the display input apparatus 38 illustrated in FIG. 6 differs before and after the tooth edges 9T of the bucket 9 face the target plane 70. For example, the processing unit 44 of the display control apparatus 39 illustrated in FIG. 6 changes the color of the pointer 73I before and after the bucket 9 faces the target plane 70, or changes the shade of the facing compass 73, or changes the display mode of the pointer 73I from flashing to lighting or lighting to flashing, in the pointer 73I of the facing compass 73.

By employing such a display mode of the facing compass 73, the operator of the excavator 100 can securely and intuitively recognize that the tooth edges 9T of the bucket 9 have faced the target plane 70, and thus, work efficiency improves. For example, when the excavator 100 is on a slope ground, etc., the operator views the display unit 42 or an outside terrain with the operator him/herself tilted. Thus, it is difficult to intuitively recognize that the tooth edges 9T of the bucket 9 have faced the target plane 70, only by viewing the direction indicated by the top 73IT of the pointer 73I. In addition, in the case in which the display unit 42 is placed far from the operator's seat, when the operator views the facing compass 73, it may be difficult to accurately and visually recognize that the position of the top 73IT of the pointer 73I has coincided with the position of the facing mark 73M. Hence, by making the display mode of the facing compass 73 different before and after the tooth edges 9T of the bucket 9 face the target plane 70, the operator can intuitively grasp facing of the tooth edges 9T of the bucket 9.

When the tooth edges 9T of the bucket 9 have faced the target plane 70, the processing unit 44 may display the facing compass 73 such that the design mode of the facing compass 73 is changed from that before the facing. For example, when the tooth edges 9T of the bucket 9 have faced the target plane 70, display may be performed such that the facing compass 73 serving as posture information is changed to text indicating "completion of facing", or a predetermined mark by which the operator can intuitively understand the completion of facing may be displayed as posture information. In addition, as posture information, a target rotation angle may be displayed on the display unit 42, instead of the facing compass 73 or together with the facing compass 73. The operator can allow the bucket 9 to face the target plane 70 by operating the excavator 100 such that the magnitude of the displayed target rotation angle approaches zero. Next, the posture information display control according to the present embodiment will be described in more detail.

Figure 15:
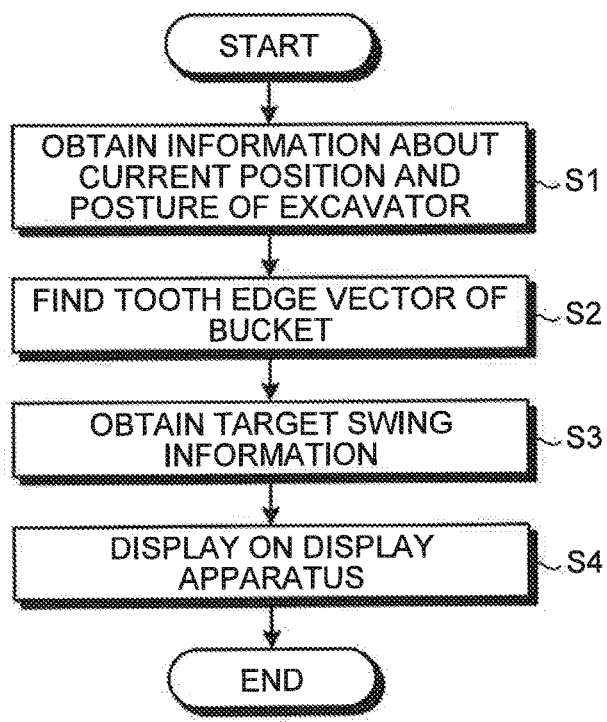
FIG. 15 is a flowchart illustrating an example of posture information display control.

FIG. 15 is a flowchart illustrating an example of posture information display control. Upon performing posture information display control, at step S1, the display control apparatus 39, more specifically the processing unit 44, obtains a tilt angle of the bucket 9 (hereinafter, referred to as a bucket tilt angle, as appropriate) θ4 and the current position of the excavator 100. The bucket tilt angle θ4 is detected by the bucket tilt sensor 18D illustrated in FIGS. 4 and 6. The current position of the excavator 100 is detected by the GNSS antennas 21 and 22 and the three-dimensional position sensor 23 illustrated in FIG. 6. The processing unit 44 obtains information indicating the bucket tilt angle θ4 from the bucket tilt sensor 18D, and obtains information indicating the current position of the excavator 100 from the GNSS antennas 21 and 22, the tilt angle sensor 24, and the three-dimensional position sensor 23.

Then, processing proceeds to step S2, and the processing unit 44 finds a tooth edge vector B of the bucket 9. When the bucket 9 has a plurality of teeth 9, the tooth edge vector B is a vector in the same direction as a tooth edge array line LBT (see FIG. 2) connecting the tooth edges 9T. When the bucket 9 includes one tooth 9Ba like the bucket 9a illustrated in FIG. 3, the tooth edge vector B is a vector extending in a direction perpendicular to the direction in which the tooth edge 9Ta extends. The tooth edge vector B is found based on the bucket tilt angle θ4 which is the tilt angle of the bucket 9 with respect to the third axis AX3 illustrated in FIG. 2 or 4, and the information about the current position and posture of the excavator 100. Next, an example of a technique for finding the tooth edge vector B will be described.

(Example of a Technique for Determining the Tooth Edge Vector B)

Figure 16:
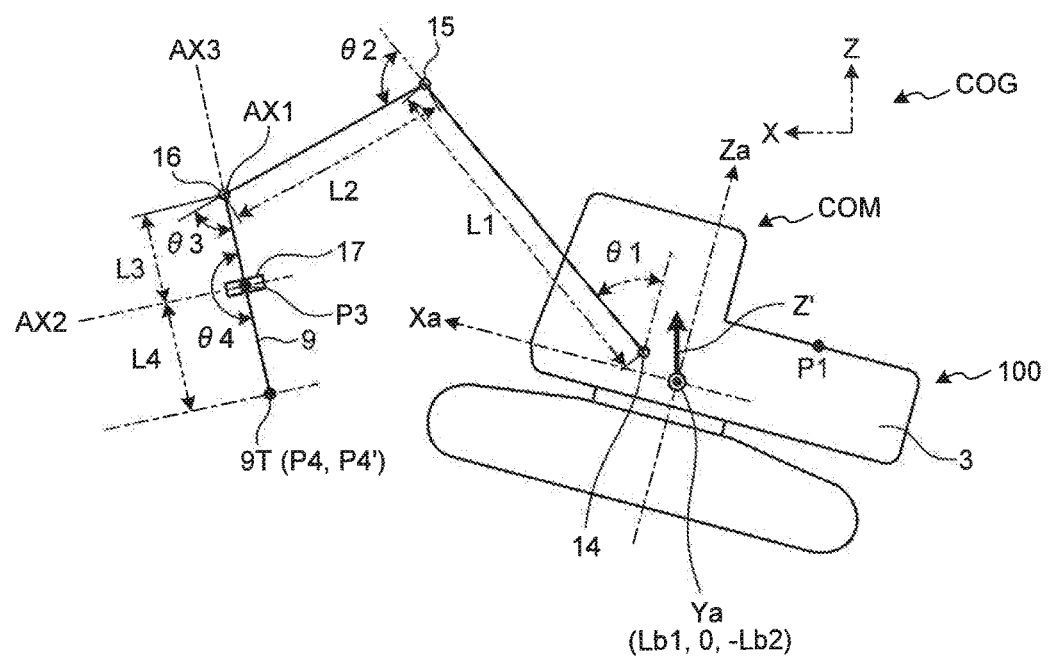
FIG. 16 is a diagram for describing an example of a technique for finding a tooth edge vector.
Figure 17:
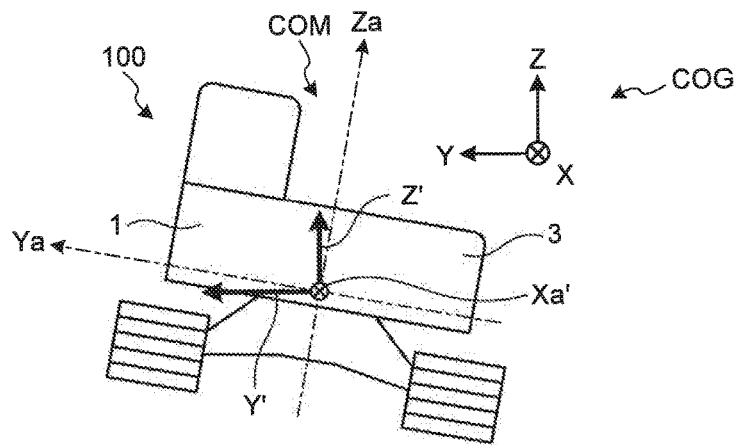
FIG. 17 is a diagram for describing an example of the technique for finding a tooth edge vector.
Figure 18:
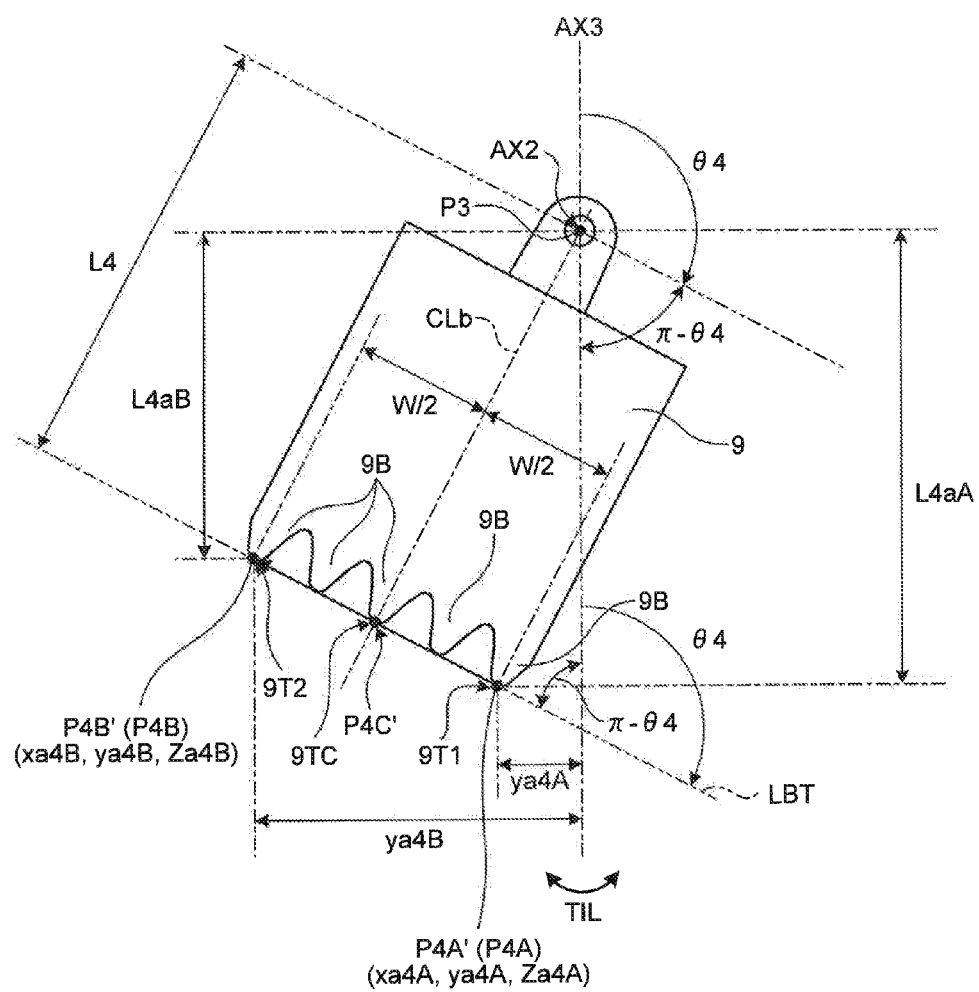
FIG. 18 is a diagram for describing an example of the technique for finding a tooth edge vector.
Figure 19:
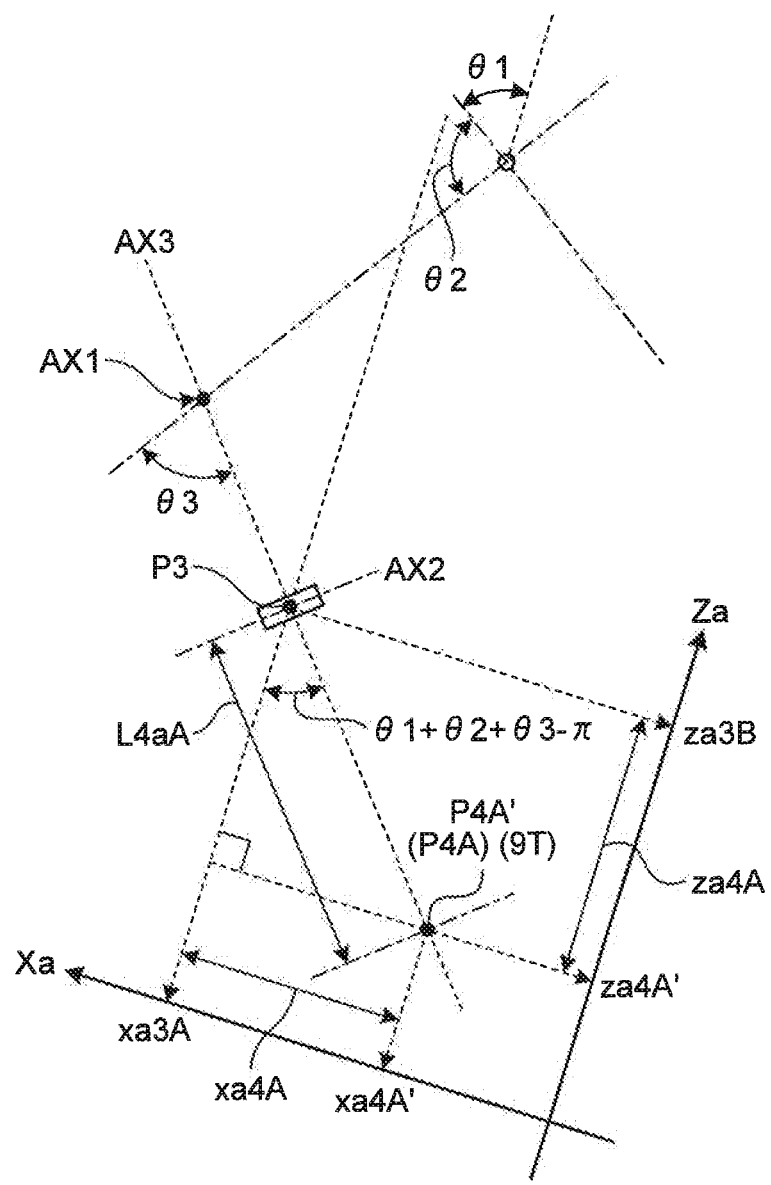
FIG. 19 is a diagram for describing an example of the technique for finding a tooth edge vector.
Figure 20:
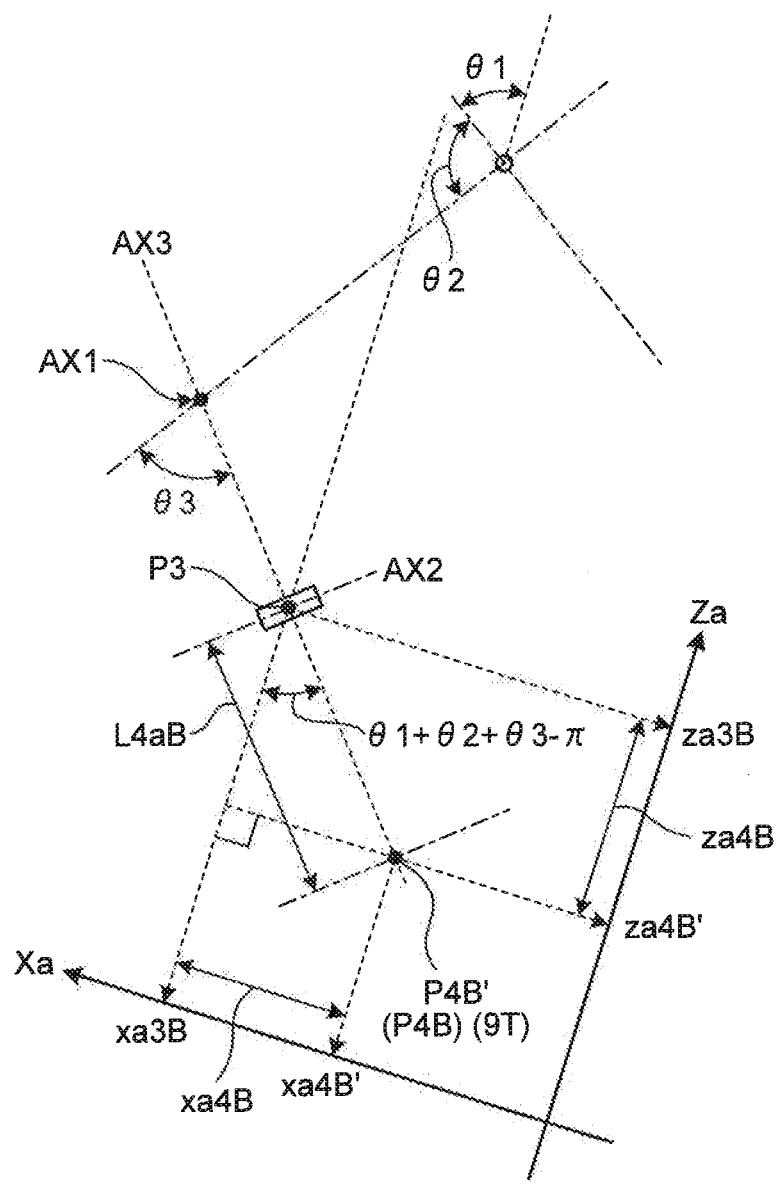
FIG. 20 is a diagram for describing an example of the technique for finding a tooth edge vector.

FIGS. 16 to 20 are diagrams for describing an example of a technique for finding the tooth edge vector B. FIG. 16 is a side view of the excavator 100, FIG. 17 is a rear view of the excavator 100, FIG. 18 is a diagram illustrating the tilted bucket 9, and FIGS. 19 and 20 are diagrams illustrating the current tooth edge vector B in the Ya-Za plane of the vehicle main body coordinate system. In this technique, the current tooth edge vector B is the position of the tooth edges 9T at the center in the width direction of the bucket 9.

Upon finding the tooth edge vector B, the display control apparatus 39 finds, as illustrated in FIG. 16, a vehicle main body coordinate system [Xa, Ya, Za] with the above-described placement position P1 of the GNSS antenna 21 as its origin. In this example, it is assumed that the front-rear direction of the excavator 100, i.e., the Xa-axis direction of a vehicle main body coordinate system COM, is tilted with respect to the X-axis direction of a global coordinate system COG. In addition, the coordinates of the boom pin 14 in the vehicle main body coordinate system COM are (Lb1, 0, −Lb2) and are prestored in the storage unit 43 of the display control apparatus 39. The Ya-coordinate of the boom pin 14 does not need to be 0 and may have a predetermined value.

The three-dimensional position sensor 23 illustrated in FIGS. 4 and 6 detects (computes) the placement positions P1 and P2 of the GNSS antennas 21 and 22. The processing unit 44 obtains the coordinates of the detected placement positions P1 and P2, and calculates a unit vector in the Xa-axis direction using equation (1). In equation (1), P1 and P2 represent the coordinates of the placement positions of P1 and P2, respectively.

$$Xa = (P1 - P2)/|P1 - P2| \quad (1)$$

When, as illustrated in FIG. 16, a vector Z' which passes through planes represented by two vectors Xa and Za and which is perpendicular in space to the vector Xa is introduced, the relationships of equations (2) and (3) hold. The "c" in equation (3) is a constant. From equations (2) and (3), Z' is represented as shown in equation (4) equation. Furthermore, when a vector perpendicular to Xa and Z' illustrated in FIG. 17 is Y', Y' is as shown in equation (5) equation.

$$(Z', Xa) = 0 \quad (2)$$

$$Z' = (1-c) \times Z + c \times Xa \quad (3)$$

$$Z' = Z + \{(Z, Xa)/((Z, Xa) - 1)\} \times (Xa - Z) \quad (4)$$

$$Y' = Xa \perp Z' \quad (5)$$

As illustrated in FIG. 17, the vehicle main body coordinate system COM is obtained by rotating a coordinate system [Xa, Y', Z'] around the Xa-axis at the above-described roll angle θ5, and thus, is represented as shown in equation (6).

$$[XaYaZa] = [XaY'Z'] \begin{bmatrix} 1 & 0 & 0 \\ 0 & \cos\theta 5 & \sin\theta 5 \\ 0 & -\sin\theta 5 & \cos\theta 5 \end{bmatrix} \quad (6)$$

In addition, the processing unit 44 obtains detection results of the first stroke sensor 18A, the second stroke sensor 18B, and the third stroke sensor 18C, and finds the above-described current tilt angles θ1, θ2, and θ3 of the boom 6, the arm 7, and the bucket 9, using the obtained detection results. Coordinates P3 (xa3, ya3, za3) on the second axis AX2 in the vehicle main body coordinate system COM can be found by equations (7), (8), and (9), using the tilt angles θ1, θ2, and θ3 and the lengths L1, L2, and L3 of the boom 6, the arm 7, and the linkage member 8. The coordinates P3 are coordinates on the second axis AX2 and at the center in the axial direction of the tilt pin 17.

$$xa3 = Lb1 + L1 \times \sin\theta 1 + L2 \times \sin(\theta 1 + \theta 2) + L3 \times \sin(\theta 1 + \theta 2 + \theta 3) \quad (7)$$

$$ya3 = 0 \quad (8)$$

$$za3 = -Lb2 + L1 \times \cos\theta 1 + L2 \times \cos(\theta 1 + \theta 2) + L3 \times \cos(\theta 1 + \theta 2 + \theta 3) \quad (9)$$

The tooth edge vector B illustrated in FIG. 18 can be found from coordinates P4A (first tooth edge coordinates P4A) of a first tooth edge 9T1 (first tooth edge 9T1) on the one end side in the width direction of the bucket 9, and coordinates P4B (second tooth edge coordinates P4B) of a second tooth edge 9T (second tooth edge 9T2) on the other end side. The first tooth edge coordinates P4A and the second tooth edge coordinates P4B can be found from first tooth edge coordinates P4A' (xa4A, ya4A, za4A) and second tooth edge coordinates P4B' (xa4B, ya4B, za4B) with reference to the coordinates P3 (xa3, ya3, za3) in the vehicle main body coordinate system COM.

The first tooth edge coordinates P4A' (xa4A, ya4A, za4A) can be found by equations (10), (11), and (12), using the bucket tilt angle θ4 detected by the bucket tilt sensor 18D, the length L4 of the bucket 9, and the distance W between the first tooth edge 9T1 and the second tooth edge 9T2 in the width direction of the bucket 9 (hereinafter, referred to as a maximum tooth-edge-to-tooth-edge distance, as appropriate). The second tooth edge coordinates P4B' (xa4B, ya4B, za4B) can be found by equations (13), (14), and (15), using the bucket tilt angle θ4 detected by the bucket tilt sensor 18D, the length L4 of the bucket 9, and the distance W between the first tooth edge 9T1 and the second tooth edge 9T2 in the width direction of the bucket 9.

Equation (10) is an equation for determining a distance (xa4A) between coordinates xa3A and xa4A' illustrated in FIG. 19. The distance (xa4A) is determined with reference to a central axis CLb in the width direction of the bucket 9, i.e., coordinates P4C' of a tooth edge 9TC in the position of one-half of the maximum tooth-edge-to-tooth-edge distance (W×(½)=W/2). Equation (11) is an equation for determining a distance (ya4A) illustrated in FIG. 18. The distance (ya4A) is a distance between the third axis AX3 and the first tooth edge 9T1 in a direction orthogonal to the third axis AX3. Equation (12) is an equation for determining a distance (za4A) between coordinates za3A and za4A' illustrated in FIG. 19.

$$xa4A = \left\{L4 \times \sin(\pi - \theta 4) + \frac{W}{2} \times \cos(\pi - \theta 4)\right\} \times \sin(\theta 1 + \theta 2 + \theta 3 - \pi) \quad (10)$$

$$ya4A = L4 \times \cos(\pi - \theta 4) - \frac{W}{2} \times \sin(\pi - \theta 4) \quad (11)$$

$$za4A = \left\{L4 \times \sin(\pi - \theta 4) + \frac{W}{2} \times \cos(\pi - \theta 4)\right\} \times \cos(\theta 1 + \theta 2 + \theta 3 - \pi) \quad (12)$$

Equation (13) is an equation for determining a distance (xa4B) between coordinates xa3B and xa4B' illustrated in FIG. 20. The distance (xa4B) is determined with reference to the above-described coordinates P4C' of the tooth edge 9TC. Equation (14) is an equation for determining a distance (ya4B) illustrated in FIG. 18. The distance (ya4B) is a distance between the third axis AX3 and the second tooth edge 9T2 in the direction orthogonal to the third axis AX3. Equation (15) is an equation for determining a distance (za4B) between coordinates za3B and za4B' illustrated in FIG. 20.

$$xa4B = \left\{L4/\sin(\pi - \theta 4) - \frac{W}{2} \times \cos(\pi - \theta 4)\right\} \times \sin(\theta 1 + \theta 2 + \theta 3 - \pi) \quad (13)$$

$$ya4B = L4 \times \cos(\pi - \theta 4) + \frac{W}{2} \times \sin(\pi - \theta 4) \quad (14)$$

$$za4B = \left\{L4/\sin(\pi - \theta 4) - \frac{W}{2} \times \cos(\pi - \theta 4)\right\} \times \cos(\theta 1 + \theta 2 + \theta 3 - \pi) \quad (15)$$

The first tooth edge coordinates P4A' (xa4A, ya4A, za4A) and the second tooth edge coordinate P4B' (xa4B, ya4B, za4B) are, as illustrated in FIG. 18, the positions of the first tooth edge 9T1 and the second tooth edge 9T2 at the center in the width direction of the bucket 9 for when the bucket 9 is tilted at the tilt angle θ4 with respect to the third axis AX3. The bucket tilt angle θ4 is the angle of the tooth edge array line LBT which is a straight line connecting the tooth edges 9T of the plurality of teeth 9B, with reference to the third axis AX3. The clockwise bucket tilt angle θ4 when viewed from the side of the upper swing body 3 of the excavator 100 is positive.

As can be seen from FIG. 18, the distance (ya4A) and the distance (ya4B) can be determined as shown in equations (11) and (14), using the bucket tilt angle θ4, the length L4 of the bucket 9, and the maximum tooth-edge-to-tooth-edge distance W.

As can be seen from FIG. 19, the distance (xa4A) and the distance (za4A) can be determined as shown in equations (10) and (11), using the tilt angles θ1, θ2, θ3, and θ4 and the length L4 of the bucket 9. As illustrated in FIG. 18, a distance L4aA determined by computing L4×sin(π−θ4)+(W/2)×cos(π−θ4) serves as the distance L4aA illustrated in FIG. 19.

As can be seen from FIG. 20, the distance (xa4B) and the distance (za4B) can be determined as shown in equations (13) and (15), using the tilt angles θ1, θ2, θ3, and θ4 and the length L4 of the bucket 9. As illustrated in FIG. 18, a value obtained by subtracting W×cos(π−θ4) from the distance L4aA which is determined by computing L4×sin(π−θ4)+(W/2)×cos(n−θ4), i.e., L4aA−W×cos(π−θ4), serves as a distance L4aB illustrated in FIG. 20.

As described above, the first tooth edge coordinates P4A' (xa4A, ya4A, za4A) and the second tooth edge coordinates P4B' (xa4B, ya4B, za4B) are obtained with reference to the coordinates P3 (xa3, ya3, za3) of the second axis AX2. As can be seen from FIG. 19, the first tooth edge coordinates P4A (xatA, yatA, zatA) of the first tooth edge 9T1 in the vehicle main body coordinate system COM can be found using equations (16), (17), and (18) and using the coordinates P3 (xa3, ya3, za3) and the first tooth edge coordinates P4A' (xa4A, ya4A, za4A).

$$xatA = xa3 - xa4A \quad (16)$$

$$yatA = ya3 - ya4A \quad (17)$$

$$zatA = za3 - za4A \quad (18)$$

As can be seen from FIG. 20, the second tooth edge coordinates P4B (xatB, yatB, zatB) of the second tooth edge 9T2 in the vehicle main body coordinate system COM can be found using equations (19), (20), and (21) and using the coordinates P3 (xa3, ya3, za3) and the second tooth edge coordinates P4A' (xa4B, ya4B, za4B). When the first tooth edge coordinates P4A (xatA, yatA, zatA) and the second tooth edge coordinates P4B (xatB, yatB, zatB) are obtained, the tooth edge vector B can be found from these coordinates.

$$xatB = xa3 - xa4B \quad (19)$$

$$yatB = ya3 - ya4B \quad (20)$$

$$zatB = za3 - za4B \quad (21)$$

When the processing unit 44 finds, at step S2, the tooth edge vector B based on the above-described technique, the processing unit 44 proceeds processing to step S3. At step S3, the processing unit 44 finds a target rotation angle α serving as target swing information, using the tooth edge vector B found at step S2 and a normal vector N of a target plane 70. Next, a technique for finding the target rotation angle α will be described.

Figure 21:
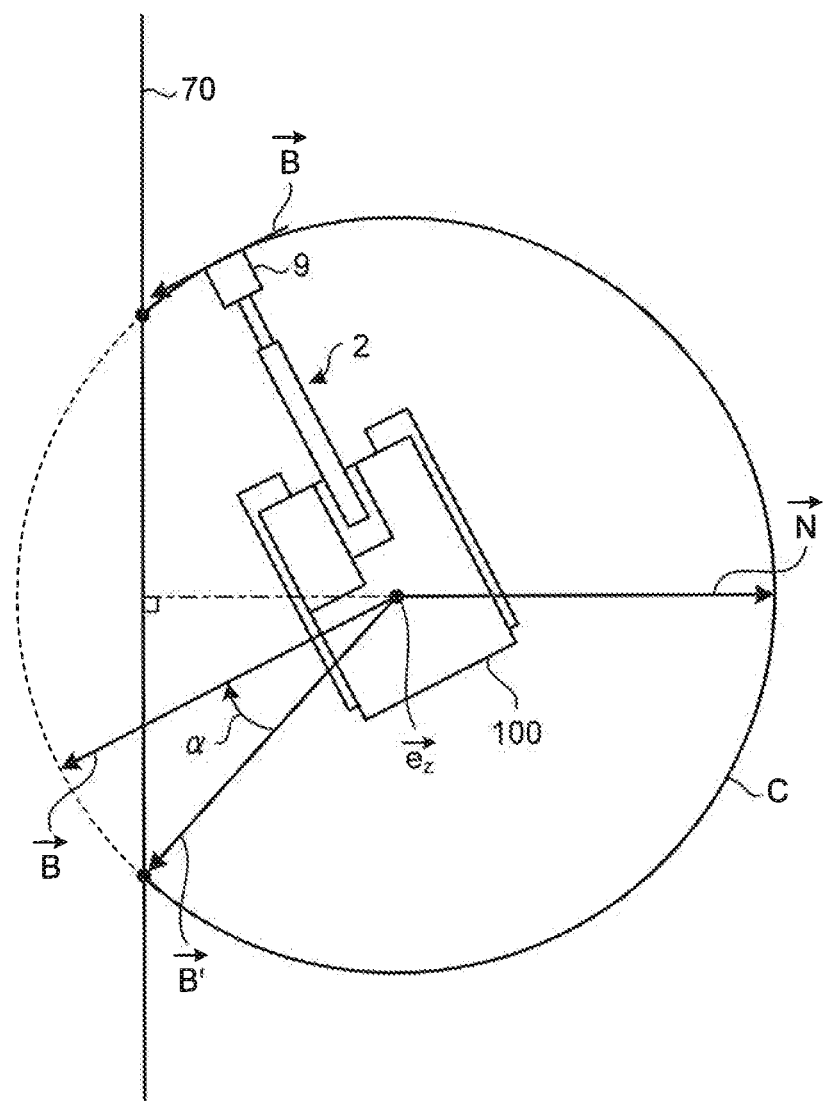
FIG. 21 is a plan view for describing a method for finding the target rotation angle.
Figure 22:
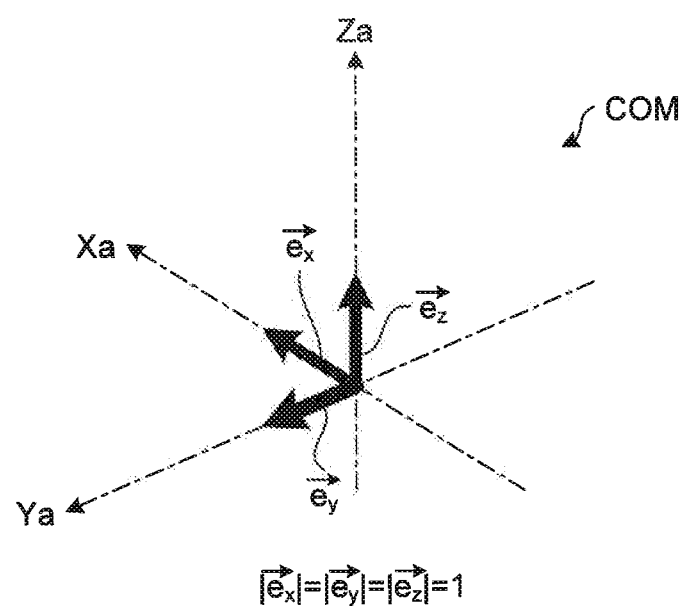
FIG. 22 is a diagram for describing a unit vector in vehicle main body coordinates.
Figure 23:
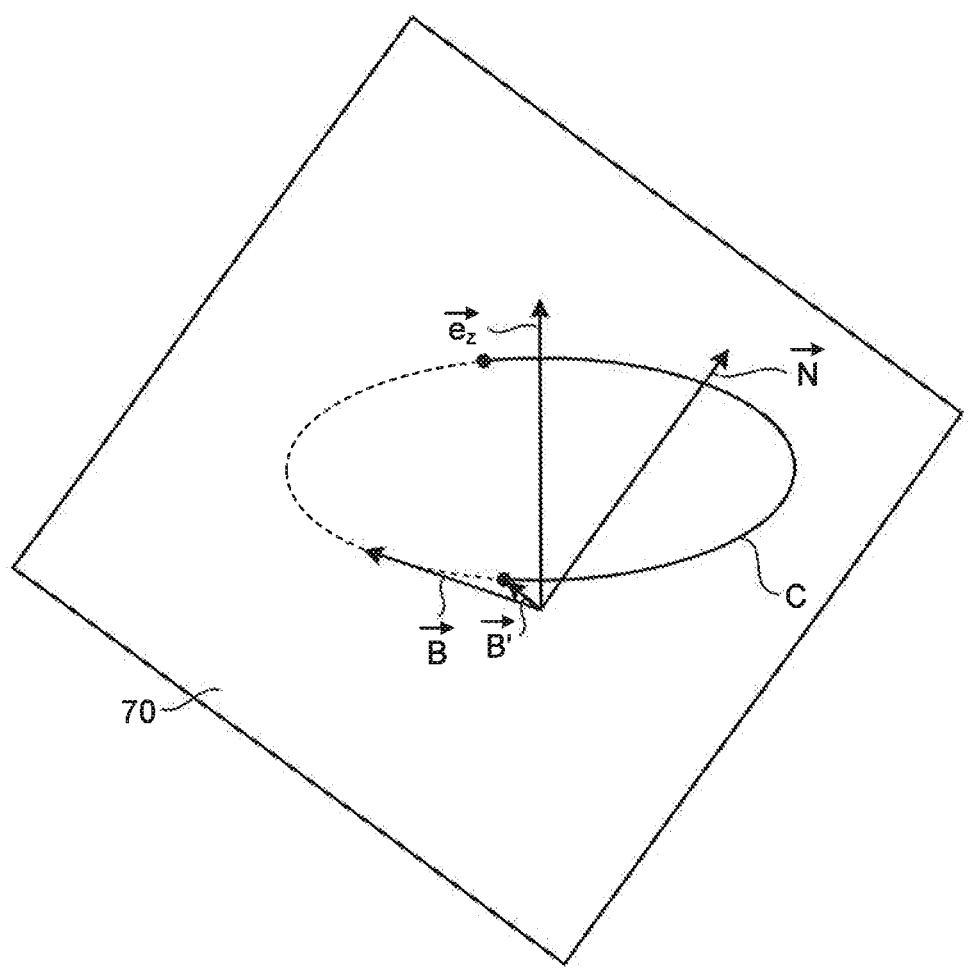
FIG. 23 is a diagram for describing a tooth edge vector and a target tooth edge vector.
Figure 24:
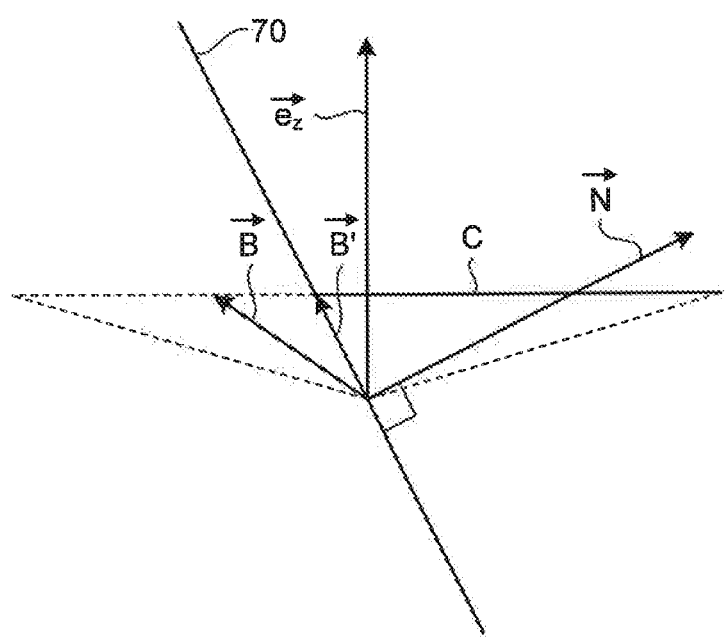
FIG. 24 is a diagram for describing the tooth edge vector and the target tooth edge vector.
Figure 25:
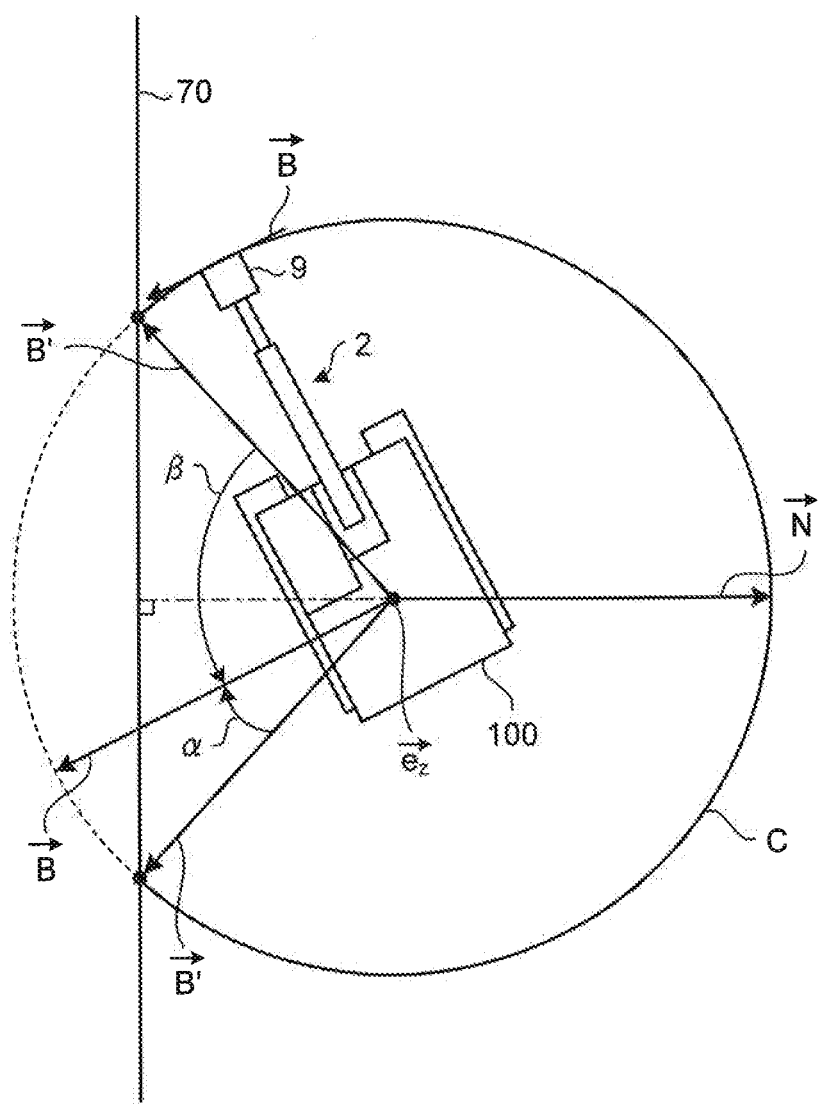
FIG. 25 is a diagram for describing target rotation angles.

FIG. 21 is a plan view for describing a method for finding the target rotation angle α. FIG. 22 is a diagram for describing a unit vector in the vehicle main body coordinate system COM. FIGS. 23 and 24 are diagrams for describing a tooth edge vector B and a target tooth edge vector B'. FIG. 25 is a diagram for describing target rotation angles α and β.

In FIGS. 23, 24, and 25, a circle C indicates a path of an arbitrary point of the bucket 9 for when the upper swing body 3 is swung about the swing central axis. A dashed line on the circle C indicates a path for when the bucket 9 enters the inner side of a target plane 70. Black dots on the circle C indicate points where the path intersects the target plane 70. In FIG. 24, although the starting point of a vector ez is on the line of the target plane 70, this is a depiction for description. In practice, the Za-axis of the excavator 100, i.e., the starting point of the vector ez, is located away from the target plane 70. In addition, although the starting point of the tooth edge vector B and the starting point of the target tooth edge vector B' are also on the line of the target plane 70, this is a depiction for description. Thus, the starting points of those two vectors may be located away from the target plane 70. FIG. 24 illustrates that, although the tooth edge vector B is not facing the target plane 70, the target tooth edge vector B' faces the target plane 70 when the upper swing body 3 including the work implement 2 is swung at a predetermined target rotation angle.

When finding the target rotation angle α, in the present embodiment, the tooth edge vector B and the target tooth edge vector B' are used. It is assumed that, when the work implement 2 and the bucket 9 mounted on the work implement 2 swing at the angle −α from the current position by allowing the upper swing body 3 to swing, a normal vector N of the target plane 70 is orthogonal to the tooth edge vector B. The target plane 70 is selected in advance by the operator, as a target work object of the excavator 100.

The tooth edge vector B for when the normal vector N of the target plane 70 is orthogonal to the tooth edge vector B is the target tooth edge vector B'. The unit vector ez illustrated in FIG. 21 is a unit vector in the Za-axis direction in the vehicle main body coordinate system COM illustrated in FIG. 22. The unit vector ez holds a relationship of |ex|=|ey|=|ez|=1 with a unit vector ex in the Xa-axis direction and a unit vector ey in the Ya-axis direction in the vehicle main body coordinate system COM. The Za-axis in the vehicle main body coordinate system COM is the swing central axis of the upper swing body 3 including the work implement 2 having the bucket 9. Hence, the unit vector ez is information including the direction of the swing central axis. A circle C illustrated in FIG. 21 indicates a path of an arbitrary point of the bucket 9 for when the excavator 100 and the target plane 70 are viewed in the Za-axis direction, and when the upper swing body 3 is swung about the swing central axis. A dashed line on the circle C indicates a path for when the bucket 9 enters the inner side of the target plane 70. Black dots on the circle C indicate points where the path intersects the target plane 70.

When the target tooth edge vector B' becomes orthogonal to the normal vector N of the target plane 70, equation (22) holds. Namely, the inner product of the target tooth edge vector B' and the normal vector N is 0. At this time, in the target plane 70, the relationship between the tooth edge vector B, the target tooth edge vector B', the normal vector N, and the unit vector ex is as illustrated in FIGS. 23 and 24. In addition, from the Rodrigues' rotation formula regarding vector rotation, the relationship between the tooth edge vector B, the target tooth edge vector B', and the unit vector ex can be represented as shown in equation (23).

$$\vec{B}' \perp \vec{N} \Leftrightarrow \vec{B}' \cdot \vec{N} = 0 \quad (22)$$

$$\vec{B}' = \vec{e}_z(\vec{e}_z \cdot \vec{B}) + [\vec{B} - \vec{e}_z(\vec{e}_z \cdot \vec{B})]\cos(-\alpha) - (\vec{B} \times \vec{e}_z)\sin(-\alpha) \quad (23)$$

From equations (22) and (23), equation (24) is obtained. When equation (24) is organized, equation (25) is obtained.

P, Q, and R in equation (25) are as shown in equation (26). To find the target rotation angle α from equation (25), P, Q, and R need to satisfy a relational expression of equation (27). Equation (25) can be rewritten into the form as shown in equation (28) by the synthesis formula of trigonometric functions. In this case, the relationship shown in equation (27) holds. That is, satisfying equation (27) indicates that the target rotation angle α can be obtained as a real solution. ϕ in equation (28) satisfies cos ϕ=P/√(P²+(Q+R)²) and sin ϕ=(Q+R)/√(P²+(Q+R)²). From equation (28), the target rotation angle α is found as shown in equation (29).

$$0 = (\vec{e}_z \cdot \vec{N})(\vec{e}_z \cdot \vec{B}) + [\vec{B} \cdot \vec{N} - (\vec{e}_z \cdot \vec{N})(\vec{e}_z \cdot \vec{B})] \cos\alpha + (\vec{B} \times$$
$$\vec{e}_z) \cdot \vec{N} \sin\alpha \vec{e}_z \cdot (\vec{N} \times \vec{B}) \sin\alpha + [\vec{N} \cdot \vec{B} - (\vec{e}_z \cdot \vec{N})(\vec{e}_z \cdot$$
$$\vec{B})] \cos\alpha = -(\vec{e}_z \cdot \vec{N})(\vec{e}_z \cdot \vec{B}) \quad (24)$$

$$P \sin\alpha + (Q+R)\cos\alpha = R \quad (25)$$

$$\begin{cases} P = \vec{e}_z \cdot (\vec{N} \times \vec{B}) \\ Q = \vec{N} \times \vec{B} \\ R = -(\vec{e}_z \cdot \vec{N})(\vec{e}_z \cdot \vec{B}) \end{cases} \quad (26)$$

$$\left| \frac{R}{\sqrt{P^2 + (Q+R)^2}} \right| \le 1 \quad (27)$$

$$\sin(\alpha + \phi) = \frac{R}{\sqrt{P^2 + (Q+R)^2}} \quad (28)$$

$$\alpha = \arcsin \frac{R}{\sqrt{P^2 + (Q+R)^2}} - \phi \quad (29)$$

The target rotation angle α can be found by equation (30) when P is greater than or equal to 0, and by equation (31) when P is less than 0. Furthermore, by substituting β=−α, equations (32) and (33) are obtained. In equation (32), p is for when P is greater than or equal 10 to 0. In equation (33), 0 is for when P is less than 0. Note that β can also be a candidate for the target amount of rotation, and is the target rotation angle and is target swing information. In the present embodiment, in the following, the target rotation angle α is referred to as a first target rotation angle α, and the target rotation angle β is referred to as a second target rotation angle β, as appropriate. The first target rotation angle α is first target swing information, and the second target rotation angle β is second target swing information. As illustrated in FIG. 25, the first target rotation angle α and the second target rotation angle β have a divisional relationship with the direction of the current tooth edge vector B at the center.

$$\alpha = \arcsin \frac{R}{\sqrt{P^2 + (Q+R)^2}} - \arcsin \frac{Q+R}{\sqrt{P^2 + (Q+R)^2}} \quad P \ge 0 \quad (30)$$

$$\alpha = \arcsin \frac{R}{\sqrt{P^2 + (Q+R)^2}} + \arcsin \frac{Q+R}{\sqrt{P^2 + (Q+R)^2}} - \pi \quad (31)$$
$$P < 0$$

$$\beta = -\arcsin \frac{R}{\sqrt{P^2 + (Q+R)^2}} - \arcsin \frac{Q+R}{\sqrt{P^2 + (Q+R)^2}} - \pi \quad (32)$$
$$P \ge 0$$

$$\beta = -\arcsin \frac{R}{\sqrt{P^2 + (Q+R)^2}} + \arcsin \frac{Q+R}{\sqrt{P^2 + (Q+R)^2}} \quad P < 0 \quad (33)$$

The processing unit 44 finds the first target rotation angle α and the second target rotation angle β using the above-described equations (26) and (30) to (33) and using the unit vector ez, the normal vector N of the target plane 70, and the tooth edge vector B found at step S2. The unit vector ez and the normal vector N of the target plane 70 are stored in the storage unit 43 of the display control apparatus 39 illustrated in FIG. 6. When the first target rotation angle α and the second target rotation angle β are found, the processing unit 44 determines which one to use to control the display state of the facing compass 73.

Figure 26:
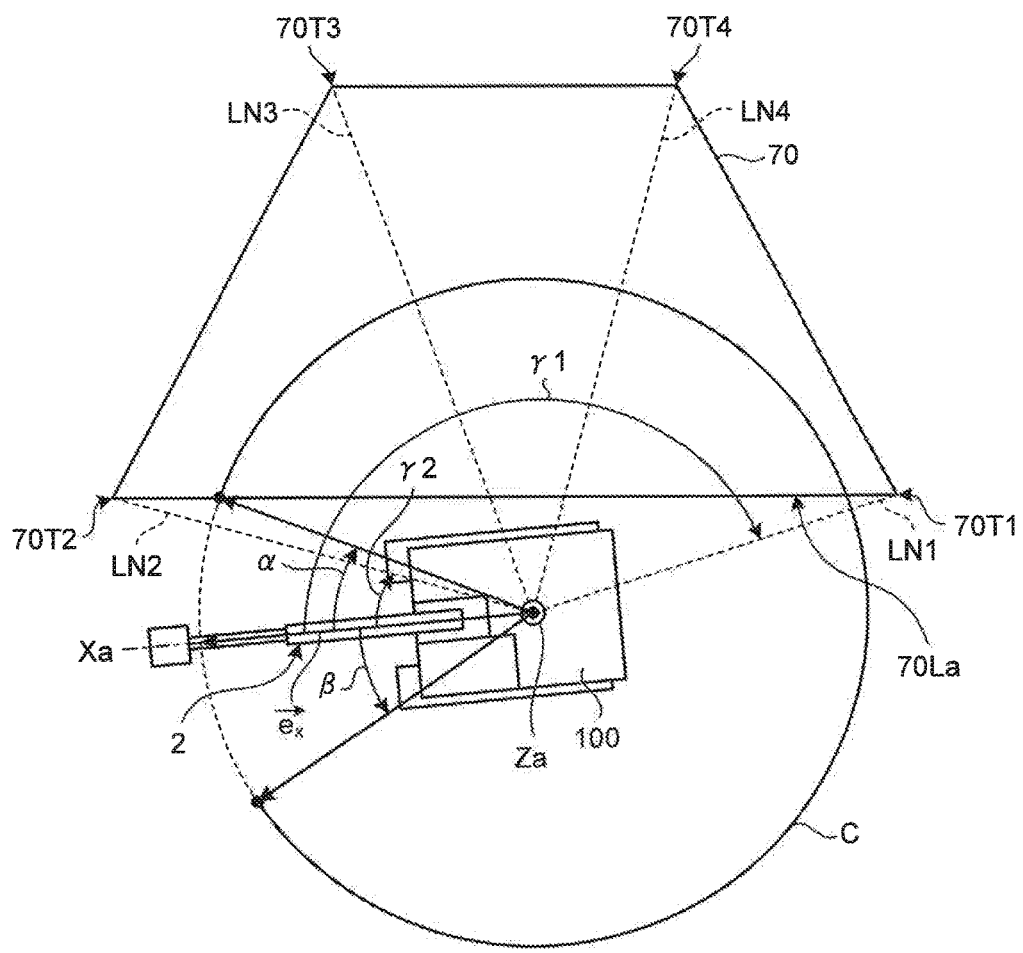
FIG. 26 is a plan view for describing a method for selecting a first target rotation angle or a second target rotation angle to be used to display the facing compass.
Figure 27:
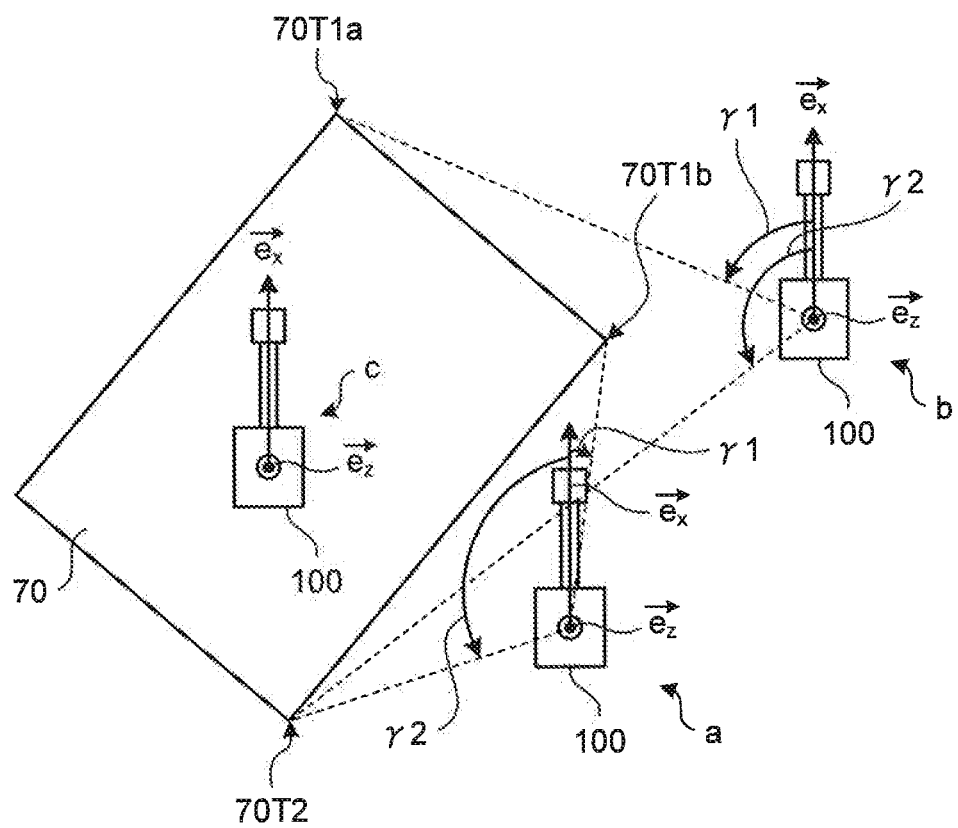
FIG. 27 is a diagram illustrating a relationship between the excavator and the target plane.
Figure 28:
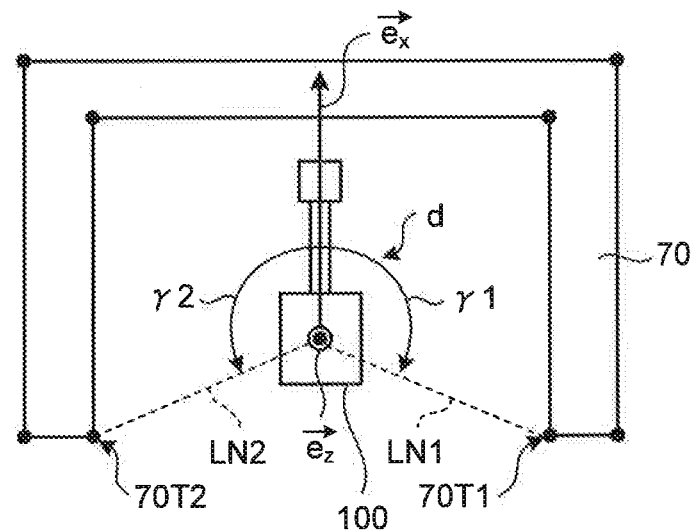
FIG. 28 is a diagram illustrating a relationship between the excavator and the target plane.
Figure 29:
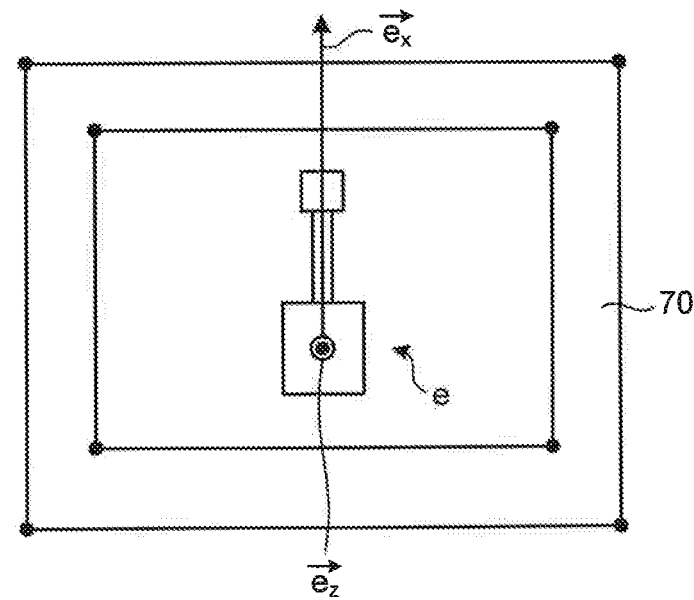
FIG. 29 is a diagram illustrating a relationship between the excavator and the target plane.
Figure 30:
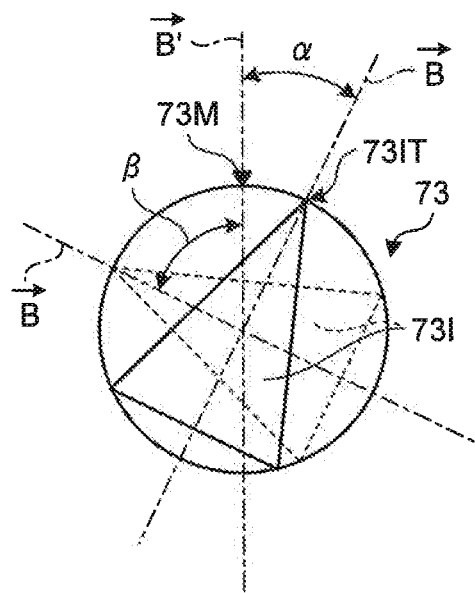
FIG. 30 is a diagram illustrating the facing compass.

FIG. 26 is a plan view for describing a method for selecting the first target rotation angle α or the second target rotation angle β to be used to display the facing compass 73. FIGS. 27 to 29 are diagrams illustrating a relationship between the excavator 100 and the target plane 70. FIG. 30 is a diagram illustrating the facing compass 73.

A circle C illustrated in FIG. 26 indicates a path of an arbitrary point of the bucket 9 for when the excavator 100 and the target plane 70 are viewed in the Za-axis direction, and when the upper swing body 3 is swung about the swing central axis. In addition, a direction formed by the first target rotation angle α with respect to the Xa-axis is indicated by an arrow. Likewise, a direction formed by the second target rotation angle β with respect to the Xa-axis is indicated by an arrow. In addition to them, details of FIG. 26 will be described later.

Upon selecting the first target rotation angle α or the second target rotation angle β to be used to display the facing compass 73, the processing unit 44 determines a first angle γ1 and a second angle γ2. First, four imaginary lines LN1, LN2, LN3, and LN4 are extended from an arbitrary point on the swing central axis (Za-axis) to a plurality of (four in the present embodiment) ends 70T1, 70T2, 70T3, and 70T4 of the target plane 70 on condition that the imaginary lines LN1, LN2, LN3, and LN4 have the same coordinates in the Za-axis direction as the arbitrary point. That is, with the target plane 70 and the excavator 100 viewed in the Za-axis direction as a two-dimensional plane, the imaginary lines LN1, LN2, LN3, and LN4 are extended from the Za-axis to the plurality of ends 70T1, 70T2, 70T3, and 70T4 of the target plane 70. In the example illustrated in FIG. 26, the target plane 70 is a quadrilateral, and the vertices of the quadrilateral are the ends. The target plane 70 is the quadrilateral target plane 70 where a plurality of triangular polygons whose planes' tilts are considered to be substantially the same are combined into one, but the target plane 70 may be a polygon such as a triangle or a pentagon. Even if the target plane 70 is a triangle or a pentagon, as described above, imaginary lines LN1, LN2, LN3, and LN4 are extended to ends.

Furthermore, a forward line which is perpendicular to the swing central axis (Za-axis) and which is extended forward of the excavator 100 is determined. The forward line is forward of the Xa-axis which is a front-rear direction axis in a local coordinate system (Xa-Ya-Za) of the excavator 100, i.e., a portion of the Xa-axis on the side of the work implement 2. Angles each formed by each of the four imaginary lines LN1, LN2, LN3, and LN4 and the forward line (Xa-axis) as viewed from the swing central axis (Za-axis) side are found. Here, a counterclockwise direction about the Za-axis with reference to the Xa-axis when the excavator 100 is viewed from the top is defined as a positive direction, and a clockwise direction as a negative direction.

Of the found plurality of (four in the present embodiment) angles, a maximum value and a minimum value are picked up. The maximum value is the first angle $\gamma 1$, and the minimum value is the second angle $\gamma 2$. In the case illustrated in FIG. 26, as described above, the counterclockwise direction about the Za-axis with reference to the Xa-axis is defined as the positive direction, and the clockwise direction as the negative direction. Thus, the first angle $\gamma 1$ is greater in its absolute value of the angle than the second angle $\gamma 2$, but in a magnitude relationship, the first angle $\gamma 1$ is smaller than the second angle $\gamma 2$. That is, in the example illustrated in FIG. 26, in the case in which the minimum value is the first angle $\gamma 1$ and the maximum value is the second angle $\gamma 2$, an end of the target plane 70 for when the first angle $\gamma 1$ is formed is the end 70T1. In the case in which the minimum value is the first angle $\gamma 1$ and the maximum value is the second angle $\gamma 2$, an end of the target plane 70 for when the second angle $\gamma 2$ is formed is the end 70T2. The example illustrated in FIG. 26 illustrates the case in which the ends 70T1 and 70T2 are selected. A side 70La connecting the ends 70T1 and 70T2 is one side forming the target plane 70.

The first angle (hereinafter, referred to as a first direction angle, as appropriate) $\gamma 1$ will be further described using FIG. 26. The first direction angle $\gamma 1$ is an angle formed by the Xa-axis orthogonal to the swing central axis, i.e., the Za-axis, and having a direction parallel to the operating plane of the work implement 2, and the imaginary line (hereinafter, referred to as a first straight line, as appropriate) LN1 connecting from one end 70T1 to the Za-axis when the target plane 70 is viewed from the Za-axis side. In the present embodiment, the operating plane of the work implement 2 is a plane formed by the Xa-axis and the Za-axis of the vehicle main body coordinate system of the excavator 100. Hence, in the present embodiment, the direction orthogonal to the Za-axis and parallel to the operating plane of the work implement 2 is the Xa-axis direction of the vehicle main body coordinate system of the excavator 100. The second angle (hereinafter, referred to as a second direction angle, as appropriate) $\gamma 2$ is an angle formed by the Xa-axis and the imaginary line (hereinafter, referred to as a second straight line, as appropriate) straight line LN2 connecting from the other end 70T2 to the Za-axis when the target plane 70 is viewed from the Za-axis side.

As such, the first angle $\gamma 1$ is an angle having a minimum value when comparing angles formed by the Xa-axis and each of the imaginary lines LN1, LN2, LN3, and LN4 passing through the Za-axis and the ends 70T1, 70T2, 70T3, and 70T4 of the target plane 70, taking into account the positive and negative of the angles. The second angle is an angle having a maximum value when comparing the angles formed by the Xa-axis and each of the imaginary lines LN1, LN2, LN3, and LN4, taking into account the positive and negative of the angles. In the present embodiment, the absolute value of the first angle $\gamma 1$ is greater than that of the second angle $\gamma 2$. In the present embodiment, it may be said that, of the angles formed by the Xa-axis and each of the imaginary lines LN1, LN2, LN3, and LN4 passing through the Za-axis and the ends 70T1, 70T2, 70T3, and 70T4 of the target plane 70, an angle having a maximum absolute value is one of the first angle $\gamma 1$ and the second angle $\gamma 2$, and an angle having a minimum absolute value is the other one.

One of the three examples illustrated in FIG. 27 is the case in which the excavator 100 is in the position "a". When the target plane 70 is viewed from the Za-axis side, ends selected by the above-described method are an end 70T1b and an end 70T2, and the former serves as a first end and the latter serves as a second end. On the other hand, in the case in which the excavator 100 is in the position "b", when the target plane 70 is viewed from the Za-axis side, ends selected by the above-described method are an end 70T1a and the end 70T2, and the former serves as a first end and the latter serves as a second end.

The example illustrated in FIG. 28 illustrates the case in which a design plane 70 surrounds three sides of the excavator 100. In this case, the excavator 100 is in the position "d" where the excavator 100 is surrounded by the design plane 70. As in the above-described case in which the excavator 100 is in the position "a", a first angle $\gamma 1$ and a second angle $\gamma 2$ are found by extending a first straight line LN1 and a second straight line LN2 which serve as imaginary lines from an arbitrary point on the swing central axis (Za-axis) to ends of the target plane 70 (black dots illustrated in FIG. 28) when the target plane 70 is viewed from the Za-axis side, on condition that the first straight line LN1 and the second straight line LN2 have the same coordinates in the Za-axis direction as the arbitrary point. As a result, an end 70T1 and an end 70T2 are present at locations where the first straight line LN1 or the second straight line LN2 formed by the first angle $\gamma 1$ or the second angle $\gamma 2$ with reference to the Xa-axis (vector ex) is extended. The end 70T1 serves as a first end, and the end 70T2 serves as a second end. The example illustrated in FIG. 28 does not illustrate the case in which the first angle $\gamma 1$ and the second angle $\gamma 2$ are identical, but just illustrates the case in which the design plane 70 surrounds three sides of the excavator 100.

One of the three examples illustrated in FIG. 27 is the case in which the excavator 100 is in the position "c", i.e., the case in which the excavator 100 is on the target plane 70. In addition, the example illustrated in FIG. 29 illustrates the case in which a design plane 70 surrounds all around the excavator 100. Note that, when the excavator 100 is in the position "d" or "e", the processing unit 44 performs the process of determining that the excavator 100 is surrounded by the target plane 70.

The processing unit 44 finds a first direction angle $\gamma 1$ and a second direction angle $\gamma 2$, based on position information of the Za-axis and position information of the Xa-axis of the excavator 100 and position information of the target plane 70. Then, based on the first direction angle $\gamma 1$ and the second direction angle $\gamma 2$, the processing unit 44 selects either one of a first target rotation angle $\alpha$ and a second target rotation angle $\beta$, as information for displaying the facing compass 73. Displaying the facing compass 73 includes changing the display mode of the facing compass 73, determining the tilt of the pointer 73I, moving the pointer 73I, and the like. Next, this technique will be described.

First, a direction angle range for the target plane 70 determined by the first direction angle $\gamma 1$ and the second direction angle $\gamma 2$ is defined. As illustrated in FIG. 26, the direction angle range is a range in an angle formed by the second direction angle $\gamma 2$ and the first direction angle $\gamma 1$. When both of the first target rotation angle $\alpha$ and the second target rotation angle $\beta$ are in this direction angle range, the processing unit 44 compares the magnitudes of absolute values between the first target rotation angle $\alpha$ and the second target rotation angle 3. For example, when the absolute value of the second target rotation angle $\beta$ is greater than that of the first target rotation angle $\alpha$, i.e., when a relationship of $|\alpha| \le |\beta|$ holds, the processing unit 44 selects the first target rotation angle $\alpha$. When the absolute value of the second target rotation angle $\beta$ is smaller than that of the first target rotation angle α, i.e., when a relationship of |α|>|β| holds, the processing unit 44 selects the second target rotation angle β. The processing unit 44 uses the selected target rotation angle, as the target amount of rotation, i.e., target swing information, to display the facing compass 73.

When only the first target rotation angle α is in the above-described direction angle range, the processing unit 44 selects the first target rotation angle α and uses the first target rotation angle α as target swing information to display the facing compass 73. The example illustrated in FIG. 26 corresponds to this. That is, only the first target rotation angle α is in the direction angle range for the target plane 70 determined by the first direction angle γ1 and the second direction angle γ2, and the second target rotation angle β is out of the direction angle range. On the other hand, when only the second target rotation angle β is in the above-described direction angle range, the processing unit 44 selects the second target rotation angle β and uses the second target rotation angle α to display the facing compass 73.

When neither the first target rotation angle α nor the second target rotation angle β is in the above-described direction angle range, the processing unit 44 selects either one of the first target rotation angle α and the second target rotation angle β, based on equation (34). In equation (34), θ1 is the first direction angle γ1 and θ2 is the second direction angle γ2. The processing unit 44 determines a difference between the first direction angle γ1 and the first target rotation angle α, and further determines a difference between the second direction angle γ2 and the first target rotation angle α. Furthermore, the processing unit 44 compares magnitudes between the two determined differences, and selects the smaller one. Here, the selected one is a first selection. Furthermore, the processing unit 44 determines a difference between the first direction angle γ1 and the second target rotation angle β, and further determines a difference between the second direction angle γ2 and the second target rotation angle β. The processing unit 44 compares magnitudes between the two determined differences, and selects the smaller one. Here, the selected one is a second selection. Furthermore, the processing unit 44 compares magnitudes between the first selection and the second selection.

That is, a comparison is made between the smaller one of (θ1−α) and (θ2−α) and the smaller one of (θ1−β) and (θ2−β). As a result of the comparison, if equation (34) holds, then the processing unit 44 selects the first target rotation angle α, and if equation (34) does not hold, then the processing unit 44 selects the second target rotation angle β, and uses the selected one as target swing information to display the facing compass 73.

$$\min_{i=1,2}|\theta i - \alpha| \leq \min_{i=1,2}|\theta i - \beta| \qquad (34)$$

One of the three examples illustrated in FIG. 27 is the case in which the excavator 100 is in the position "c". Namely, when the excavator 100 is on the target plane 70, the direction angle range for the target plane 70 is considered to be all directions. In this case, the processing unit 44 performs the same process as that performed when both of the first target rotation angle α and the second target rotation angle β are in the above-described direction angle range, and selects either one of the first target rotation angle α and the second target rotation angle β, and uses the selected one as target swing information to display the facing compass 73.

The case in which, as illustrated in FIG. 29, the target plane 70 surrounds the excavator 100 is also handled in the same manner as the case in which the excavator 100 is on the target plane 70. That is, the processing unit 44 performs the same process as that performed when both of the first target rotation angle α and the second target rotation angle β are in the above-described direction angle range, and selects either one of the first target rotation angle α and the second target rotation angle β. As a result, the processing unit 44 selects either one of the first target rotation angle α and the second target rotation angle β, and uses the selected one as target swing information to display the facing compass 73.

When either one of the first target rotation angle α and the second target rotation angle β is selected as target swing information for displaying the facing compass 73, the processing unit 44 proceeds to step S4, and displays an image corresponding to the selected target swing information, specifically, the facing compass 73, on the display unit 42 illustrated in FIG. 6. In this case, the processing unit 44 performs display with the pointer 73I rotated such that the direction of the target tooth edge vector B' corresponds to the position of the facing mark 73M of the facing compass 73, and the position of the top 73IT of the pointer 73I according to the current direction of the tooth edge vector B is displayed. For example, when the first target rotation angle α is selected as target swing information, as illustrated in FIG. 30, the pointer 73I is tilted at the first target rotation angle α with respect to the facing mark 73M. When the second target rotation angle β is selected as target swing information, as illustrated in FIG. 30, the pointer 73I rotates at the second target rotation angle β with respect to the facing mark 73M.

Figure 31:
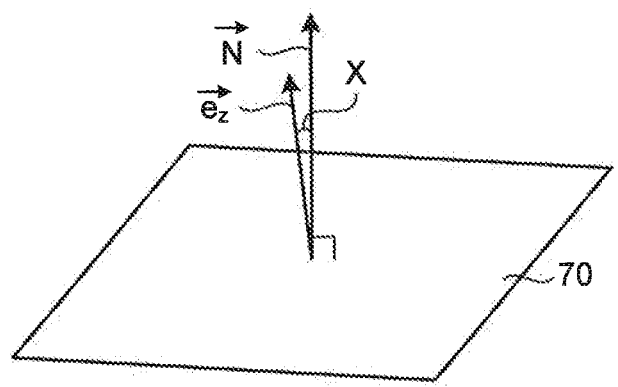
FIG. 31 is a diagram illustrating a relationship between a target plane, a unit vector, and a normal vector.
Figure 32:
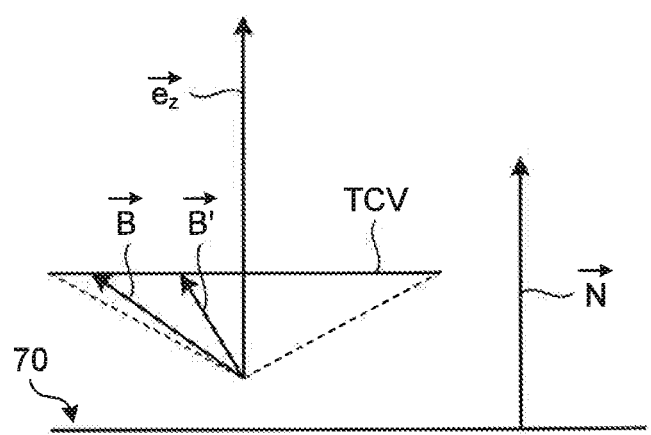
FIG. 32 is a conceptual diagram illustrating an example of the case in which a target rotation angle is not found (no-solution state).
Figure 33:
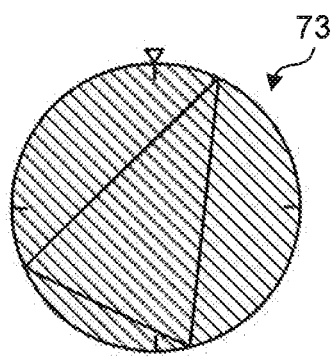
FIG. 33 is a diagram illustrating exemplary display of the facing compass for when target swing information is not obtained.
Figure 34A:
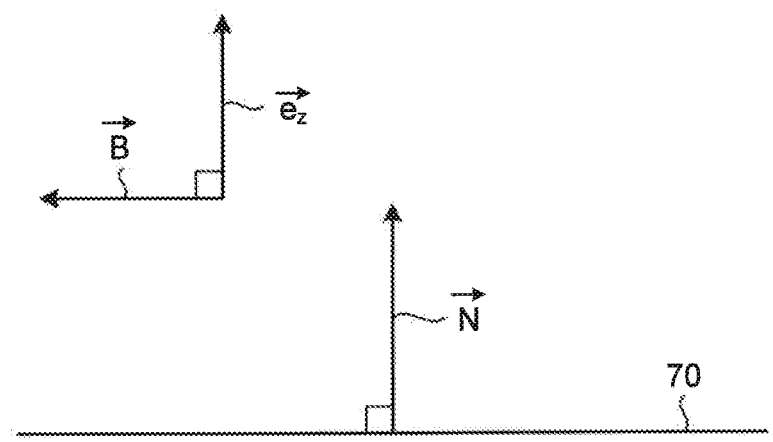
FIG. 34a is a conceptual diagram illustrating an example of the case in which a target rotation angle is not found or not determined (indeterminate solution state).
Figure 34B:
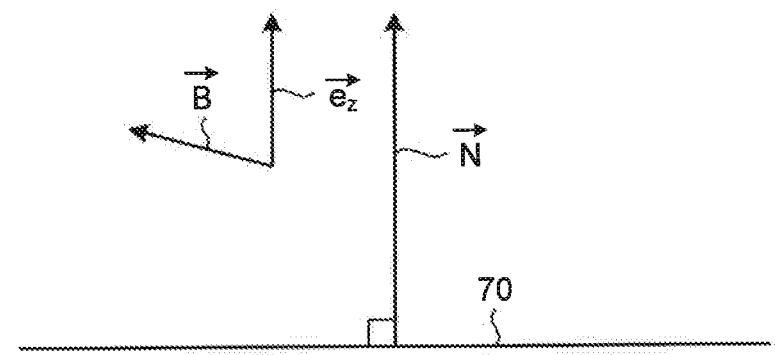
FIG. 34b is a conceptual diagram illustrating an example of the case in which a target rotation angle is not found or not determined (indeterminate solution state).

FIG. 31 is a diagram illustrating a relationship between a target plane 70, a unit vector ez, and a normal vector N. FIG. 32 is a conceptual diagram illustrating an example of the case in which a target rotation angle is not found (no-solution state). FIG. 32 illustrates a relationship between a swing plane TCV and a target plane 70 for when a path created by an arbitrary position of the bucket 9 when the upper swing body 3 including the work implement 2 is swung is viewed from the side. As will be described later, FIG. 33 is a diagram illustrating exemplary display of the facing compass 73 for when target swing information is not obtained. FIGS. 34b and 34b are conceptual diagrams illustrating an example of the case in which a target rotation angle is not found or the case in which a target rotation angle is not determined (indeterminate solution state).

In the present embodiment, when the relationship between the unit vector ez and the normal vector N does not satisfy the above-described equation (27), target swing information cannot be mathematically obtained (no-solution state). The no-solution state is a state in which, the bucket 9 is a tilt bucket and even if the bucket 9 greatly rotates around the tilt pin 17 and the upper swing body 3 is swung with the bucket 9 greatly rotating, the tooth edge vector B of the tooth edges 9T and the normal vector N of the target plane 70 do not become orthogonal to each other. FIG. 32 illustrates such a state. FIG. 32 is a conceptual diagram illustrating an example of the case in which the first target rotation angle and the second target rotation angle are not found (no-solution state), and describes a relationship between a swing plane and the target plane for when a path created by an arbitrary position of the bucket 9 when the upper swing body 3 including the work implement 2 is swung is viewed from the side. As can be seen from FIG. 32, in the no-solution state, a tooth edge vector B does not become parallel to the target plane 70. In other words, in the no-solution state, the tooth edge vector B is not orthogonal to a normal vector of the target plane 70. Thus, in a case such as that of FIG. 32, target swing information cannot be mathematically obtained.

When the relationship defined in equation (35) is not satisfied, target swing information is not determined to a fixed value (indeterminate solution state). FIG. 31 illustrates a relationship between X, the Za-axis (vector ez), and the normal vector N of the target plane 70. X in equation (35) is predetermined. X has a magnitude at which the Za-axis which is the swing central axis of the upper swing body 3 including the work implement 2 and the normal vector N of the target plane 70 are considered to be parallel to each other.

$$\frac{|\bar{e}_z \cdot \bar{N}|}{|\bar{N}|} > \cos(X) \qquad (35)$$

When the target swing information is in an indeterminate solution state, the tooth edges 9T of the bucket 9 always face the target plane 70, and thus, provision of guidance by the pointer 73I on the operations of the upper swing body 3 including the work implement 2, etc., itself has no meaning. FIGS. 34a and 34b are conceptual diagrams illustrating an example of the case in which a first target rotation angle and a second target rotation angle are not found (indeterminate solution state). As illustrated in FIG. 34a, the excavator 100 is on a plane 70, and a tooth edge vector B of the bucket 9 is parallel to the target plane 70. In other words, the tooth edge vector B is orthogonal to a normal vector N of the target plane 70. In such a case, target swing information is in an indeterminate solution state and thus cannot be obtained.

It is assumed that, in the case in which the bucket 9 is a tilt bucket, the bucket 9 is rotated around the tilt pin 17 as illustrated in FIG. 34b from the state of FIG. 34a such that the tooth edge vector B does not become parallel to the target plane 70. Even if the upper swing body 3 is swung in this state, the tooth edge vector B does not become orthogonal to the normal vector N of the target plane 70. Thus, again, target swing information is in an indeterminate solution state and thus cannot be obtained.

Hence, the processing unit 44 makes the display mode of an image corresponding to the target swing information which is displayed on the display unit 42 of the display input apparatus 38 different from that for when the target swing information is determined to a fixed value. In the present embodiment, as illustrated in FIG. 33, the processing unit 44 grays out the facing compass 73. By doing so, the operator can intuitively recognize that the facing compass 73 is not displaying target swing information which is original information. Namely, as illustrated in FIG. 33, by the processing unit 44 graying out the facing compass 73, the operator can grasp that the facing compass 73 is not displaying the angle at which the upper swing body 3 including the work implement 2 is to swing. At this time, the movement of the pointer 73I may be stopped. Doing so helps the operator further focus on work.

Next, the case in which target swing information cannot be mathematically obtained, i.e., a no-solution state, will be described in detail. In the case in which target swing information cannot be obtained, guidance on the operations of the upper swing body 3 including the work implement 2, etc., by rotation of the pointer 73I cannot be provided. The case in which target swing information cannot be obtained is, for example, the case in which, as illustrated in FIG. 32, the swing plane TCV and the target plane 70 when a path created by the tip of the tooth edge vector B is viewed from the side do not intersect each other. For example, when the bucket tilt angle θ4 becomes excessive as a result of tilting the bucket 9 by the tilt function of the bucket 9, a state such as that of FIG. 32 is caused, resulting in not being able to obtain target swing information. In such a case, as with an indeterminate solution state where the target swing information is not determined to a fixed value, the processing unit 44 makes the display mode of the facing compass 73 displayed on the display unit 42 different from that for when the target swing information is obtained. In the present embodiment, the facing compass 73 is grayed out. By doing so, the operator can intuitively recognize that the facing compass 73 is not displaying target swing information which is original information. Namely, by graying out the facing compass 73 as illustrated in FIG. 33, the fact that the facing compass 73 is not displaying the angle at which the upper swing body 3 including the work implement 2 is to swing can be grasped. At this time, the movement of the pointer 73I may be stopped. Doing so helps the operator further focus on work.

In the present embodiment, when the processing unit 44 changes the mode of the facing compass 73 displayed on the screen 42P of the display unit 42, the processing unit 44 may, for example, use sound notification in combination. In this case, for example, the processing unit 44 provides sound notification at predetermined intervals from the sound generating apparatus 46 illustrated in FIG. 6, before the tooth edges 9T of the bucket 9 face the target plane 70, and reduces the sound intervals as the tooth edge vector B and the target plane 70 become more parallel to each other. Then, when the tooth edges 9T of the bucket 9 have faced the target plane 70, the processing unit 44 continuously provides sound notification for a predetermined period of time, and then, stops the sound notification. By doing so, the operator of the excavator 100 can recognize facing of the tooth edges 9T of the bucket 9 with respect to the target plane 70 not only by vision by the facing compass 73, but also by both vision and hearing by sound, and thus, work efficiency further improves.

When the bucket 9 is a tilt bucket, the flexibility in the direction of the tooth edge array line LBT of the bucket 9 increases, complicating computations for displaying the pointer 73I of the facing compass 73. In the present embodiment, the display system 101 finds a first target rotation angle α and a second target rotation angle β which serve as target swing information, based on the tooth edge vector B, the normal vector N of the target plane 70, and the unit vector ez in the Za-axis direction which is the swing central axis of the upper swing body 3 including the work implement 2. As such, by using the tooth edge vector B of the bucket 9, even if the bucket 9 is a tilt bucket, the display system 101 can easily compute a target rotation angle required for the tooth edges 9T to face the target plane 70.

In addition, by using the tooth edge vector B of the bucket 9, even if the bucket 9 is a tilt bucket having a tilt function and is rotated about the second axis AX2 and tilted, or even if the bucket 9 does not have a tilt function, the display system 101 can properly display a target rotation angle required for the tooth edges 9T to face the target plane 70, on the facing compass 73. As a result, the display system 101 can provide information for assisting in the operations of the work implement 2, in such a manner that the operator can readily and intuitively understand the information. Hence, for example, even an operator who is not used to handling a tilt bucket can easily allow the tooth edges 9T of the bucket 9 to face the target plane 70 only by performing swing operations on the upper swing body 3 according to the display of the facing compass 73. As such, the display system 101 can present the operator of the excavator 100 with appropriate information for allowing the tooth edges 9T of the bucket 9 to face the target plane.

In the case of considering only the orientation (tilt) of the target plane 70, when a target rotation angle at which the tooth edges 9T of the bucket 9 face the target plane 70 is found from the direction of the tooth edge array line LBT of the bucket 9, i.e., the direction of the tooth edge vector B, in general, two real solutions thereof including a multiple solution are found. They are a first target rotation angle $\alpha$ and a second target rotation angle $\beta$. The display system 101 selects either one of the first target rotation angle $\alpha$ and the second target rotation angle $\beta$ as target swing information, based on a direction angle range for the target plane 70 which is determined by a first direction angle $\gamma 1$ and a second direction angle $\gamma 2$. By doing so, the display system 101 can select target swing information indicating a proper and fewer amount of rotation for the target plane 70 having a finite region. Thus, the operator can allow the tooth edges 9T of the bucket 9 to face the target plane 70 at a minimum amount of swing with no waste, by following the pointer 73I indicated by the facing compass 73. As such, the display system 101 can present the operator of the excavator 100 with appropriate information for allowing the tooth edges 9T of the bucket 9 to face the target plane.

Although the present embodiment is described above, the present embodiment is not limited to the above-described content. In addition, the above-described components include those that can be easily assumed by those skilled in the art, substantially the same ones, and those in a so-called range of equivalency. Furthermore, the above-described components can be combined, as appropriate. Furthermore, various omissions, replacements, or changes can be made to the components without departing from the spirit and scope of the present embodiment.

For example, the content of each guidance screen is not limited to that described above, and may be changed as appropriate. In addition, some or all of the functions of the display control apparatus 39 may be performed by a computer disposed external to the excavator 100. The input unit 41 of the display input apparatus 38 is not limited to that of a touch panel type, and may be operating members such as hard keys or switches. Namely, the display input apparatus 38 may be structured such that the display unit 42 and the input unit 41 are separated from each other.

Although in the above-described embodiment the work implement 2 has the boom 6, the arm 7, and the bucket 9, the work implement 2 is not limited thereto. For example, the boom 6 may be an offset boom. In addition, the bucket 9 is not limited to a tilt bucket, and may be a bucket that does not have a tilt function.

Although in the above-described embodiment the posture and positions of the boom 6, the arm 7, and the bucket 9 are detected by detection means such as the first stroke sensor 18A, the second stroke sensor 18B, and the third stroke sensor 18C, the detection means are not limited thereto. For example, as the detection means, angle sensors that detect the tilt angles of the boom 6, the arm 7, and the bucket 9 may be provided.

Although the above-described embodiment shows the case of the work implement 2 having a structure in which, as illustrated in FIG. 16, the third axis AX3 and the second axis AX2 are orthogonal to each other, the work implement 2 may have a structure in which the third axis AX3 and the second axis AX2 are not orthogonal to each other. In this case, by storing necessary work implement data in the storage unit 43, appropriate information for allowing the tooth edges 9T of the bucket 9 to face the target plane can be presented to the operator of the excavator 100.

In addition, although in the present embodiment a bucket tilt angle $\theta 4$ is detected using the bucket tilt sensor 18D illustrated in FIGS. 4 and 6, the configuration is not limited thereto. A bucket tilt angle $\theta 4$ may be detected using, for example, stroke sensors that detect the stroke lengths of the tilt cylinders 13, instead of the bucket tilt sensor 18D. In this case, the display control apparatus 39, more specifically, the processing unit 44, finds, as a bucket tilt angle $\theta 4$, a tilt angle of the tooth edges 9T or the tooth edge array 9TG of the bucket 9 with respect to the third axis AX3, from the stroke lengths of the tilt cylinders 13 and 13 detected by the stroke sensors.

REFERENCE SIGNS LIST

1 VEHICLE MAIN BODY
2 WORK IMPLEMENT
3 UPPER SWING BODY
4 OPERATOR CAB
5 TRAVELING APPARATUS
6 BOOM
7 ARM
8 BUCKET
8 LINKAGE MEMBER
9, 9a, and 9b BUCKET
9B and 9Ba TOOTH
9T, 9Ta, and 9TC TOOTH EDGE
9T1 FIRST TOOTH EDGE
9T2 SECOND TOOTH EDGE
9TG and 9TGa TOOTH EDGE ARRAY
10 BOOM CYLINDER
11 ARM CYLINDER
12 BUCKET CYLINDER
13 TILT CYLINDER
14 BOOM PIN
15 ARM PIN
16 BUCKET PIN
17 TILT PIN
19 POSITION DETECTING UNIT
21 and 22 ANTENNA
25 OPERATING APPARATUS
26 WORK IMPLEMENT ELECTRONIC CONTROL APPARATUS
27 VEHICLE CONTROL APPARATUS
35 WORK IMPLEMENT SIDE STORAGE UNIT
36 ARITHMETIC UNIT
37 PROPORTIONAL CONTROL VALVE
37W WORK CONTROL VALVE
37D TRAVELING CONTROL VALVE
38 DISPLAY INPUT APPARATUS
39 DISPLAY CONTROL APPARATUS
41 INPUT UNIT
42 DISPLAY UNIT
43 STORAGE UNIT
44 PROCESSING UNIT
70 DESIGN PLANE
70T1 ONE END
70T2 OTHER END
73 FACING COMPASS
73I POINTER
100 EXCAVATOR
101 DISPLAY SYSTEM B TOOTH EDGE VECTOR
B' TARGET TOOTH EDGE VECTOR
ez UNIT VECTOR
LBT TOOTH EDGE ARRAY LINE
N NORMAL VECTOR
α FIRST TARGET ROTATION ANGLE
β SECOND TARGET ROTATION ANGLE
γ1 FIRST DIRECTION ANGLE
γ2 SECOND DIRECTION ANGLE

The invention claimed is:

1. A display system for an excavating machine, the display system being used for an excavating machine that can allow an upper swing body including a work implement having a bucket to swing about a predetermined swing central axis, the display system comprising:
   a vehicle state detecting unit that detects information about a current position and posture of the excavating machine;
   a storage unit that stores at least position information of a target plane indicating a target shape of a work object; and
   a processing unit that
   obtains first target swing information and second target swing information indicating an amount of swing of the upper swing body including the work implement, based on information including a direction of a tooth edge of the bucket, information including a direction orthogonal to the target plane, and information including a direction of the swing central axis, the amount of swing being required for the tooth edge of the bucket to face the target plane, and the direction of the tooth edge of the bucket being determined based on the information about the current position and posture of the excavating machine, and
   selects the first target swing information or the second target swing information, based on the obtained first target swing information and second target swing information and a first angle and a second angle, and displays an image corresponding to the selected target swing information on a screen of a display apparatus, the first angle being a minimum value and the second angle being a maximum value among angles formed by an axis orthogonal to the swing central axis and parallel to an operating plane of the work implement, and imaginary lines passing through the swing central axis and ends of the target plane.

2. The display system for excavation work according to claim 1, wherein when the excavating machine is present on the target plane or is surrounded by the target plane, the processing unit selects one of the first target swing information and the second target swing information that has a larger absolute value.

3. The display system for an excavating machine according to claim 1, wherein when target swing information which is the first target swing information or the second target swing information is not determined or when the target swing information is not obtained, the processing unit makes a display mode of the image corresponding to the target swing information displayed on the display apparatus different from that for when the target swing information is determined or when the target swing information is obtained.

4. The display system for an excavating machine according to claim 1, wherein the processing unit makes a mode of the image displayed on the screen of the display apparatus different before and after the tooth edge of the bucket faces the target plane.

5. The display system for an excavating machine according to claim 1, wherein
   the bucket rotates about a first axis and rotates about a second axis orthogonal to the first axis, by which the tooth edge is tilted with respect to a third axis orthogonal to the first axis and the second axis,
   the display system further comprises a bucket tilt detecting unit that detects a tilt angle of the bucket, and
   the processing unit determines a direction of the tooth edge of the bucket, based on the tilt angle of the bucket detected by the bucket tilt angle detecting unit and the information about the current position and posture of the excavating machine.

6. A display system for an excavating machine, the display system being used for an excavating machine that can allow an upper swing body including a work implement having a bucket to swing about a predetermined swing central axis, the display system comprising:
   a vehicle state detecting unit that detects information about a current position and posture of the excavating machine;
   a storage unit that stores at least position information of a target plane indicating a targe shape of a work object; and
   a processing unit that
   obtains first target swing information and second target swing information indicating an amount of swing of the upper swing body including the work implement, based on information including a direction of a tooth edge of the bucket, information including a direction orthogonal to the target plane, and information including a direction of the swing central axis, the amount of swing being required for the tooth edge of the bucket to face the target plane, and the direction of the tooth edge of the bucket being determined based on the information about the current position and posture of the excavating machine, and
   selects the first target swing information or the second target swing information, based on the obtained first target swing information and second target swing information and a first angle and a second angle, displays an image corresponding to the selected target swing information, together with an image corresponding to the excavating machine and an image corresponding to the target plane, on a screen of a display apparatus, and performs the display such that a mode of the image displayed on the screen of the display apparatus is different before and after the tooth edge of the bucket faces the target plane, the first angle being a minimum value and the second angle being a maximum value among angles formed by an axis orthogonal to the swing central axis and parallel to an operating plane of the work implement, and imaginary lines passing through the swing central axis and ends of the target plane.

7. An excavating machine comprising:
   an upper swing body that swings about a predetermined swing central axis, a work implement having a bucket being mounted on the upper swing body;
   a traveling apparatus provided underneath the upper swing body; and
   a display system for an excavating machine, according to claim 6.

8. A display method for an excavating machine, the display method being used for an excavating machine that can allow an upper swing body including a work implement having a bucket to swing about a predetermined swing central axis, the display method comprising:

obtaining first target swing information and second target swing information indicating an amount of swing of the upper swing body including the work implement, based on information including a direction of a tooth edge of the bucket, information including a direction orthogonal to a target plane indicating a target shape of a work object, and information including a direction of the swing central axis, the amount of swing being required for the tooth edge of the bucket to face the target plane, and the direction of the tooth edge of the bucket being determined based on information about a current position and posture of the excavating machine, selecting the first target swing information or the second target swing information based on the obtained first target swing information and second target swing information, and a first angle and a second angle, the first angle being a minimum value and the second angle being a maximum value among angles formed by an axis orthogonal to the swing central axis and parallel to an operating plane of the work implement, and imaginary lines passing through the swing central axis and ends of the target plane, and displaying an image corresponding to the selected target swing information on a screen of a display apparatus.

9. The display method for excavation work according to claim 8, wherein when the excavating machine is present on the target plane or is surrounded by the target plane, one of the first target swing information and the second target swing information that has a larger absolute value is selected.

10. An excavating machine comprising:

an upper swing body that swings about a predetermined swing central axis, a work implement having a bucket being mounted on the upper swing body;

a traveling apparatus provided underneath the upper swing body; and a display system for an excavating machine, according to claim 1.

* * * * *